US006625651B1

(12) United States Patent
Swartz et al.

(10) Patent No.: US 6,625,651 B1
(45) Date of Patent: Sep. 23, 2003

(54) ON-LINE TRANSACTION CONTROL DURING ACTIVATION OF LOCAL TELECOMMUNICATION SERVICE

(75) Inventors: Stephen J. Swartz, Maple Grove, MN (US); Anil R. Bakshi, Ridgewood, NJ (US); Christopher John Murphy, Minneapolis, MN (US); Kevin Ronald Baeth, New Hope, MN (US)

(73) Assignee: Accenture LLP, Chicago, IL (US)

( * ) Notice: Subject to any disclaimer, the term of this patent is extended or adjusted under 35 U.S.C. 154(b) by 0 days.

(21) Appl. No.: 09/451,267

(22) Filed: Nov. 30, 1999

(51) Int. Cl.[7] .............................................. G06F 15/173
(52) U.S. Cl. ...................... 709/226; 709/201; 709/217; 709/219; 709/224; 709/229; 707/10; 713/200; 713/201
(58) Field of Search ................................ 709/200–203, 709/217–219, 226–229, 250, 330–331, 220, 223–224; 707/1, 9–10; 713/200–202

(56) References Cited

U.S. PATENT DOCUMENTS

| 5,678,041 | A | * | 10/1997 | Baker et al. | ................ | 709/229 |
| 5,781,735 | A | * | 7/1998 | Southard | .................... | 709/224 |
| 5,815,665 | A | * | 9/1998 | Teper et al. | ................ | 709/229 |
| 6,163,544 | A | * | 12/2000 | Andersson et al. | ......... | 709/226 |
| 6,330,594 | B1 | * | 12/2001 | Swart | ......................... | 709/219 |
| 6,411,985 | B1 | * | 6/2002 | Fujita et al. | ................ | 709/201 |
| 6,473,807 | B1 | * | 10/2002 | Hills et al. | .................. | 709/330 |

OTHER PUBLICATIONS

Application Ser. No. 09/451,372, filed Nov. 30, 1999.
Application Ser. No. 09/451,825, filed Nov. 30, 1999.
Application Ser. No. 09/451,827, filed Nov. 30, 1999.
Application Ser. No. 09/452,067, filed Nov. 30, 1999.
Application Ser. No. 09/452,078, filed Nov. 30, 1999.

* cited by examiner

Primary Examiner—Bharat Barot
(74) Attorney, Agent, or Firm—Merchant & Gould P.C.

(57) ABSTRACT

A system, method and article of manufacture for the management of data during activation of local telecommunication service. More particularly to an on-line transaction controller that provides predetermined network information, the information residing in a storage medium. Requests are generated by one of a plurality of modules that are received by the controller. The requests provide transactional information. The transactional information is compared to the predetermined network information. The comparison bases decisions on the business rules. The transactional information is manipulated upon detection of a discrepancy relative to the predetermined network information.

34 Claims, 27 Drawing Sheets

ON-LINE TRANSACTION CONTROL DURING ACTIVATION OF LOCAL TELECOMMUNICATION SERVICE

FIELD OF THE INVENTION

The present invention relates to telecommunication networks and more particularly to the management of data during activation of local telecommunication service.

BACKGROUND OF THE INVENTION

Many services are offered by local service providers. Such services include, but are not limited to, telephone services, internet services, home shopping services, etc. Often, a local service provider does not offer expanded services, i.e., services out of their service area. Thus, customers are forced to rely on larger, i.e., national and/or international, service providers for services provided outside the service area of the local service provider. For example, many local telephone service providers do not offer long distance service. Customers of the local providers rely on long distance companies for long distance telephone service. However, several problems are inherent when offering services through a secondary provider. One such problem is that the integration of services between the two providers is not streamlined, creating connection problems such as intermittent service and sometimes even total failure of the service. Other such problems include validating that a service is authorized or that it has been cancelled or revoked. Further, larger service providers often must rely on the local service providers to collect payment for the services rendered by the larger service providers.

Many of the larger service providers offer similar or the same services to customers of local service providers while simultaneously providing expanded services to the customers of the local service providers. This gives customers the option to choose alternate, and often more reliable, service. However, a larger service provider often is limited to utilizing the systems of the local service providers. For example, a large telephone company could offer localized services to customers but would have to utilize the existing wiring of the local telephone company in order to avoid the high cost of installing wiring between the customer and the large telephone company. Thus, the larger service provider is left at the mercy of the local service providers through which its services are offered, and which are often hostile to the larger service provider attempting to enter "their" market.

An important aspect of achieving reliable service is efficient management of errors and controlling process flow of information within the local service area manager (LSAM). The bi-directional flow of information between the core network and a local service provider has created complex system requirements. Currently, fallouts and errors caused by inefficient handling of invalid or incomplete messages that reduce system performance and raise cost of operation.

For example, if a local service provider (LSP) experiences technical difficulties in its gateway but is processing orders internally, it may choose to send completions either via fax or e-mail. It is desirable that the core network be able to update the local service area manager appropriately and trigger completion processing. Similarly, it is desirable that the core network should be able to handle a situation if an order was not completed exactly as requested but the customer has been provided with service. Thus, it is desirable to isolate the core network from the complexities of an LSP ordering process. In addition, it is desirable to allow system administrators to monitor and fix simple errors in the LSAM processing, this includes validation errors and requests that may fall out of the normal process flow.

It can be seen that there is a need for on-line transaction control in the local activation management environment for management of data during activation of local telecommunication service.

It can also be seen that there is a need for on-line transaction control in the local activation management environment to provide efficient management of errors and controlling process flow of information within the LSAM.

SUMMARY OF THE INVENTION

To overcome the limitations in the prior art described above, and to overcome other limitations that will become apparent upon reading and understanding the present specification, the present invention generally discloses a on-line transaction controller in the local activation management environment, and more particularly describes the management of data during activation of local telecommunication service.

The present invention solves the above-described problems by providing a on-line transaction controller in the local activation management environment for efficient management of errors and controlling process flow of information within the LSAM.

A system in accordance with the principles of the present invention includes a method and article of manufacture for the management of data during activation of local telecommunication service. More particularly to an on-line transaction controller that provides predetermined network information, the information residing in a storage medium. Requests are generated by one of a plurality of modules that are received by the controller. The requests provide transactional information. The transactional information is compared to the predetermined network information. The comparison bases decisions on the business rules. The transactional information is manipulated upon detection of a discrepancy relative to the predetermined network information.

Other embodiments of a system in accordance with the principles of the invention may include alternative or optional additional aspects. One such aspect of the present invention includes storing a portion of the predetermined information in a local cache.

Another aspect of the present invention is that there is automatic error and reject processing of the requests, wherein corrections made to business rules to predispose similar corrections in the requests, wherein the processing of errors and rejections are logged in the storage medium.

Another aspect of the present invention is that the manipulation of the transactional information is carried out on-line and the manipulation effects at least one of a rule, a reference, and an individual transaction data having ordering and pre-ordering functionality.

Another aspect of the present invention is that there is resubmission of the requests after the information is manipulated.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention will be better understood when consideration is given to the following detailed description thereof. Such description makes reference to the annexed drawings wherein.

DETAILED DESCRIPTION

Figure 1:
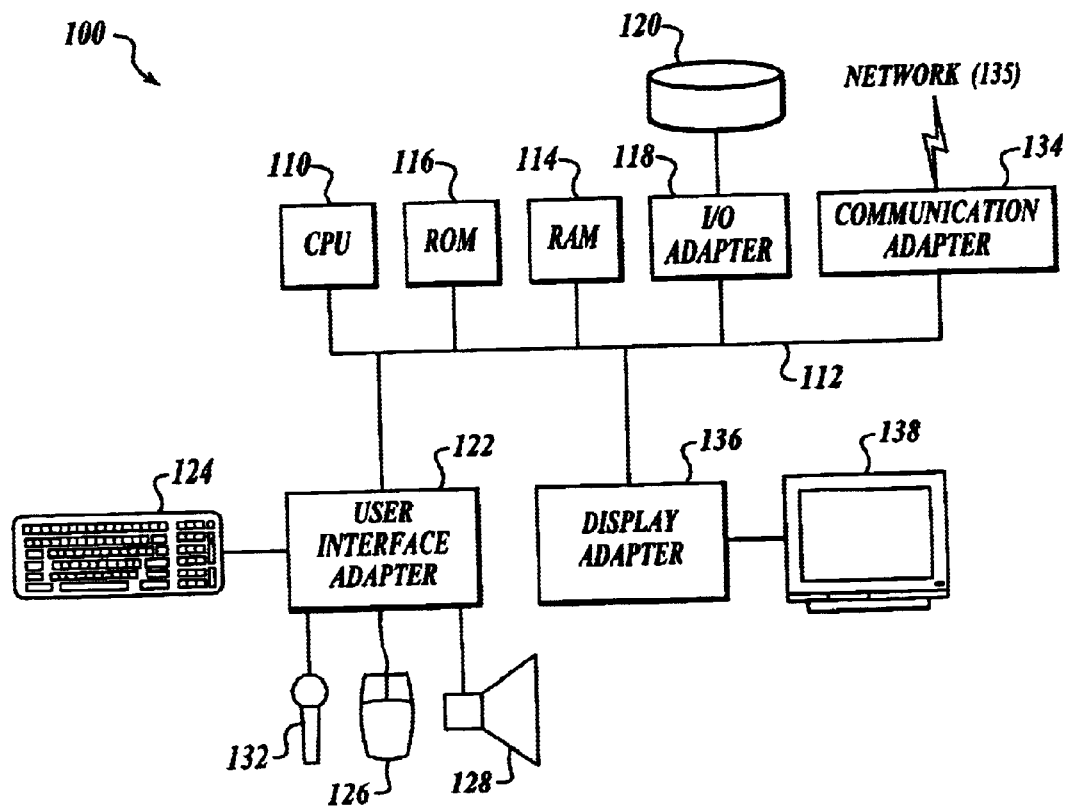
FIG. 1 is a schematic diagram of a hardware implementation of one embodiment of the present invention.

In accordance with at least one preferred embodiment of the present invention, an interfacing system is provided for managing a relationship between a core telecommunication system, or larger service provider, and a local service provider. The data being managed by an on-line transaction controller. The interface may be accomplished using a hardware implementation such as is illustrated in FIG. 1. Further, various functional and user interface features of the present invention may be enabled using software programming, i.e., object-oriented programming (OOP).

Hardware Overview

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker. 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft's Windows NT, Windows/95 Operating System (OS), IBM OS/2 operating system, MACOS, or UNIX operating system.

Software Overview

Object-oriented programming (OOP) has become increasingly used to develop complex applications. As OOP moves toward the mainstream of software design and development, various software solutions require adaptation to make use of the benefits of OOP. A need exists for the principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and methods. Since it contains both data and a collection of structures and procedures, it can be visualized as a self-sufficient component that does not require other additional structures, methods or data to perform its specific task. OOP, therefore, views a computer program as a collection of largely autonomous components, called objects, each of which is responsible for a specific task. This concept of packaging data, structures, and methods together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with them (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and subassemblies. OOP technology, therefore, makes software engineering more like hardware engineering in that software is built from existing components, which are available to the developer as objects. All this adds up to an improved quality of the software as well as an increase in the speed of its development. Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smailtalk, Common Lisp Object System (CLOS), and Eiffel. Additionally, OOP capabilities are being added to more traditional popular computer programming languages such as Pascal. The benefits of object classes are summarized in the following paragraphs.

Objects and their corresponding classes break down complex programming problems into many smaller, simpler problems. Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. These limitations involve complexity, flow of control and duplication of effort and are discussed in the following paragraphs.

In a complex system, the class hierarchies for related classes can become extremely confusing, with many dozens or even hundreds of classes. A program written with the aid of class libraries is still responsible for the flow of control (i.e., it must control the interactions among all the objects created from a particular library). The programmer has to decide which functions to call at what times for which kinds of Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things, creating a duplication of effort, in slightly different ways and do not work as well together as they should.

As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making all these things work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems. Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries such as behavior versus protocol, call versus override, and implementation versus design. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

With a class library, the programmer instantiates objects and calls their member functions. It's possible to instantiate and call objects in the same way with a framework (i.e., to treat the framework as a class library), but to take full advantage of a framework's reusable design, a programmer typically writes code that overrides existing classes and is called by the framework. The framework manages the flow of control among its objects. Writing a program involves dividing responsibilities among the various pieces of software that are called by the framework rather than specifying how the different pieces should work together.

With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and a company. HTTP or other protocols could be readily substituted for HTML without undue experimentation. Information on these products is available in T.

Berners-Lee, D. Connoly, "RFC 1866: Hypertext Markup Language—2.0" (November. 1995); and R. Fielding, H, Frystyk, T. Berners-Lee, J. Gettys and J.C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in areas such as poor performance, restricted user interface capabilities, ability to produce only static Web pages, lack of interoperability with existing applications and data, and inability to scale.

Sun Microsystem's Java language solves many of the client-side problems by improving performance on the client side, enabling the creation of dynamic real-time Web applications, and providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created.

Sun defines its Java language as "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client.

Other technologies, such as those provided by Microsoft and ActiveX Technologies, give developers and Web designers wherewithal to build dynamic content for the Internet and personal computers. ActiveX includes tools for developing animation, 3-D virtual reality, video and other multimedia content. The group's building blocks are called ActiveX Controls, which are fast components that enable developers to embed parts of software in hypertext markup language (HTML) pages. ActiveX Controls work with a variety of programming languages including Microsoft's Visual C++, Borland Delphi, Microsoft Visual Basic programming system and, in the future, Microsoft's development tool for Java, code named "Jakarta."

Technical Overview of a Local Service Activation Management (LSAM) System

The Local Service Activation Management (LSAM) System is a local service provisioning capability that enables a national and/or international service provider (NSP) to quickly enter into local markets while minimizing the implementation costs and risks. More particularly, LSAM is a software program that may be used to allow a national and/or international telecommunications provider to not only provide services to local telecommunications providers more efficiently, but also to offer local services to customers as an alternative to the services provided by local service providers (LSPs). Examples of such services include telephone services, internet services, home shopping, entertainment services, or any other.service offered by a local service provider.

LSAM is also designed so that functionality can be phased in to align with the NSP local service strategy while adapting to changing LSP requirements. FIG. 1 illustrates one embodiment how this is accomplished by storing LSAM on a centralized server which may be accessed over a network 135 using a hardware implementation set forth hereinabove. The hardware implementation may include a user interface 122, display adapter 136, monitor 138, microphone 132, mouse 126 and audio output device 128. The network also may contain a CPU 110, ROM 116, RAM 114, and input/output (I/O) adapter 118, and storage medium 120. Such network 100 may include a local area network, T1 connection, the Internet, a dial-up connection, a satellite connection, etc. In another embodiment, this is accomplished by storing LSAM on a server which is connected to a telephone network that is also connected to computer systems of the NSP and several LSPs.

LSAM is more than a software framework or collection of tools. Rather, it provides a fully configured application including fully implemented business rules encoded as readily modifiable tables. This is accomplished by five major activities: (1) core product implementation, (2) configuration to the NSP's requirements, (3) custom extension to core product, again for NSP and LSP requirements, (4) standard interface development, and (5) architecture integration.

The Local Service Activation Management (LSAM) has a local service provisioning capability that embodies a number of principles. Specifically, LSAM may insulate the national and/or international service provider (NSP) core components from local service provider (LSP) specific processing and enable local service capabilities through a series of well-defined interfaces to the core systems.

Further LSAMs may be integrated within a common technical architecture and promote tight component integration and loose coupling with core systems, manage LSP-specific data and business rules, support online validation of data to support order negotiation and order completion, minimize dependency on the LSP data and processes whenever possible, and enable a multiphase development approach to support simultaneous market entries.

Solution Overview

Figure 2:
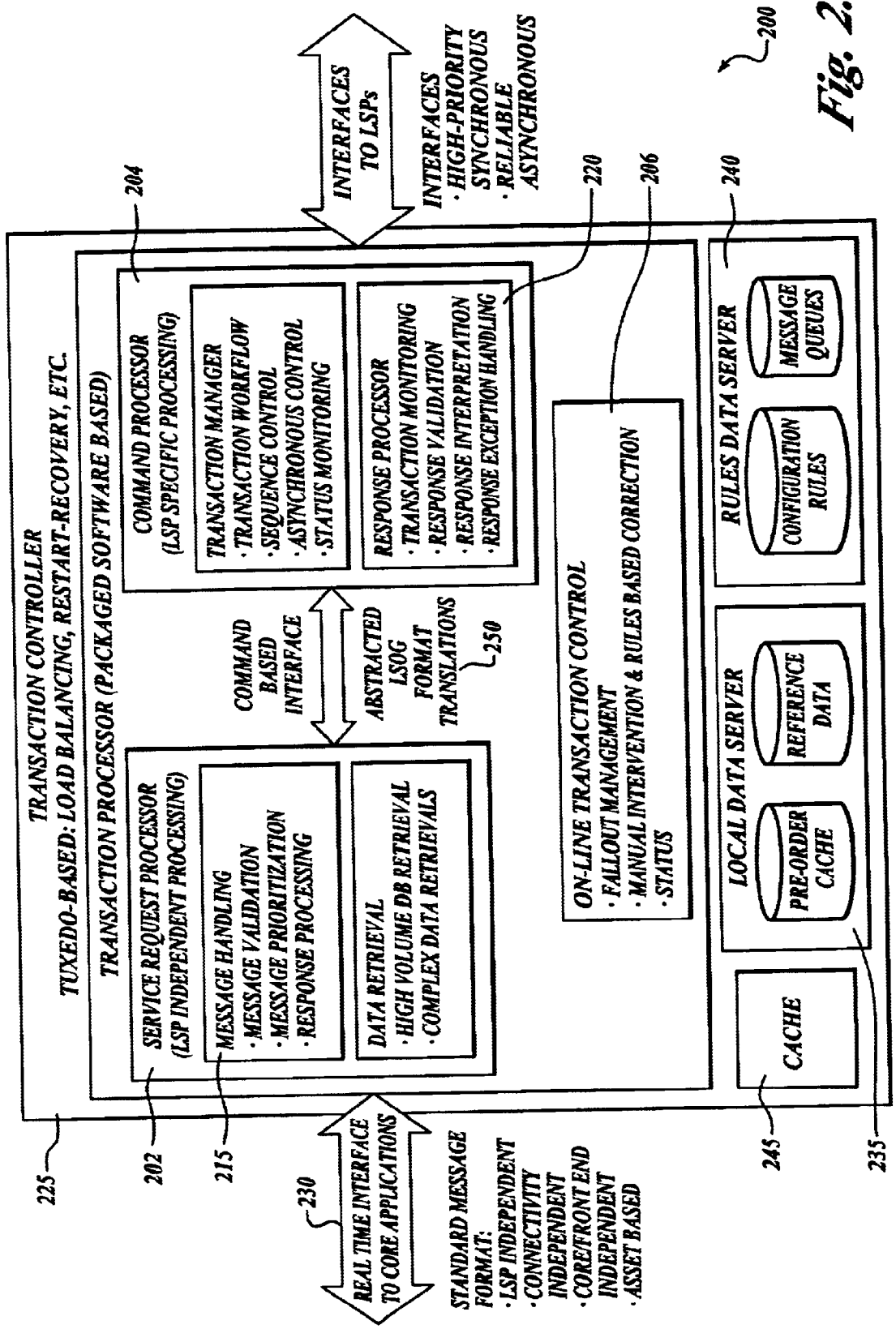
FIG. 2 is an illustration of a transaction controller in accordance with one embodiment of the present invention.

FIG. 2 illustrates three key processing components 200: (a) a high capacity, high throughput transaction processing service request processor (SRP) 202 to interface with the NSP core, (b) a standards based command processor (CP) 204 for interfacing with the LSPs, and, (c) an on-line transaction control application 206 for managing errors and controlling the process flow. These processing components are supported by a common technical architecture (transaction controller 225) to provide a robust operating environment and a common data store for local cache as well as configuration and business rules. These components and the supporting architecture have been designed to address three key business issues an NSP will face as it enters the Local Services market. These issues (workflow, performance and simultaneous market entry) are discussed in more detail below.

According to a preferred embodiment of the present invention, Quintessent's QConnect suite of software products may be utilized to provide transaction processing capabilities, a work flow and sequence control platform, a rules engine, and baseline interconnection software objects and class libraries. Quintessent's QConnect product is integrated with a Tuxedo-based front-end transaction architecture. QConnect provides a fully functional object-oriented platform, as well as standards-based service activation and pre-order application components, and configured business rule structures. The Tuxedo-based front-end processor supports a high-degree of system availability and scalability. Thus, QConnect together with Tuxedo's transaction monitor forms a baseline software installation which provides core local service activation management capabilities. From the teachings provided herein, those skilled in the art will appreciate that the following system description sets forth one preferred embodiment of a management interface between a core telecommunication system and a local service provider, although other system combinations are possible.

Workflow

The end-to-end customer care workflow (order taking, LSP provisioning, customer billing, etc.) must be as efficient as possible. This process accounts for a large percentage of costs associated with acquiring and servicing customers and often suffer from fallouts and errors caused by data integrity and process related issues. The inconsistencies associated with LSP processing further compounds this problem. Hence, the NSP must manage the end-to-end workflow, taking into account the inconsistencies of LSP provisioning while enabling low cost and high quality customer service.

Referring again to FIG. 2, LSAM supports this objective by using the SRP (Service Request Processor)202, which has the capability to validate service requests 215 against network related information maintained in a local cache (for example, valid and available telephone networks). The high-capacity, high-transaction processing nature of the SRP enables NSP core systems to perform key validations that will prevent potential errors in the end-to-end customer care process.

In addition, LSAM maintains detailed queue and state data for each transaction. This enables flexible error correction through on-line manipulation of individual transaction data, real-time manipulation of rules and reference data, subsequent transaction resends, and rule-based correction of multiple transactions or interface discrepancies.

Additionally, the information may be used during service migration and customer inquiries to monitor order status. LSAM provides the capability to monitor and report on transaction level service level agreements (SLA). The on-line transaction control provides the ability to manage errors and fallouts manually and provides tools to develop automatic fallout processing. A basic end-user application allows LSAM administrators to review and update specific orders and order status thereby facilitating the order workflow. The response processor (RP)220 of the command processor (CP) 204 enables the NSP to process LSP responses and, in the case of exceptions, to take automated actions based on business rules. Depending on the business need, the NSP can create an appropriate balance between manual or automated processes for handling exceptions.

Performance and Scalability

As the NSP launches local service offerings, LSAM must be able to scale appropriately as well as perform according to the NSP's guidelines and requirements. The performance characteristics of SRP 202 and CP 204 can be tuned independently to manage the end-to-end performance. SRP 202 interacts with the NSP core systems in a synchronous manner and therefore must be built to provide fast response times, high throughput, and high availability. The CP 204 interacts with LSPs in an asynchronous manner and should support pseudo-synchronous needs of pre-order inquiry while managing inherently unreliable long-term transactions for ordering.

The NSP is allowed to scale LSAM in several ways to meet the volume and throughput requirements. The distributed logical and physical nature of the hardware and software architecture allows individual components to be run on separate hardware servers. This enables the NSP to fine tune the performance requirements of individual components to a specific hardware server. A Tuxedo based transaction monitor provides the ability to distribute transactions to one or more instances of LSAM. This enables the NSP to add more instances of LSAM to meet additional performance needs. The different instances of LSAM can also be load balanced using the Tuxedo capabilities. The hardware architecture can be based on servers such as Sun Unix and can be scaled to provide additional performance by addition of processors, disk space and memory.

Simultaneous Market Entry

The NSP should be able to roll out its local service offering across the nation and with multiple LSPs quickly, with ease and with proportionally lower investments over time. State and local regulations and new LSPs will also require incremental custom configuration. The table driven approach to configuration minimizes the development effort needed to introduce a new market or a new LSP. Nearly all business rules are delivered through highly flexible, table driven configuration entries which minimize cost and risk. Most LSP specific information is handled within the command processor 204 and isolated beneath the LSOG (internal LSAM format) standard. This enables high re-use of complex business rules reducing maintenance and versioning issues. Additionally, the table structure for business rules and local cache allows the NSP to implement several rollout efforts in parallel, if desired. Refer to the paragraphs below discussing the "New LSP Scenario" for an example of the tasks required and the process to implement LSAM with new LSPs and markets.

Support for Business Environment

LSAM addresses the following key business needs. The service request processor 202 is implemented in an LSP independent application programming interface (API) and message processing facility that shields the NSP front-end systems such as integrated order taking (IOT) from having to deal with LSP specific complexities. For example, LSAM provides a standard messaging interface based on previously successfully implemented customer care implementations which address complex order processing and order management business rules, and accepts a single message set across state implementations, LSP jurisdictions, connectivity (provisioning) options, sale negotiation flows, and technology platforms.

The API and front-end message handling supports a real-time data retrieval mechanism enabling interactive, customer on-line service order negotiations and trouble ticketing. The system can provide efficient response times when accessing locally maintained pre-order cache tables, real-time order validations while the customer is still online, and high-priority processing enabling pseudo-synchronous access to "remote" LSP data stores.

LSAM also supports the long-lived transaction management requirements of order processing through a "high reliability" asynchronous command processor 204 which maintains and processes the variety of LSP specific rules, complex response processing issues, transaction/response matching requirements, status monitoring and proactive jeopardy identification and notifications.

GUIDING PRINCIPLES

The following table describes a preferred embodiment of how LSAM addresses several exemplary NSP guiding principles.

| NSP Guiding Principles | LSAM Solution |
| --- | --- |
| LSAM is responsible for managing Local business rules and data: | |
| LSAM provides necessary Local and LSP specific business rules to the core ordering and provisioning applications. | The Service Request Processor (SRP) 202 and Command Processor (CP) 204 both utilize business rules that govern the execution of service requests and reside in a single rule repository. |
| Message status and translation data are to be transient. | Requests are logged in an LSAM Local Data store similar to the reference data store 235 and remain there until the request is completed successfully by the LSPs and a response has been forwarded to the NSP core system. The LSAM data archiving function is then responsible for archiving and removing data from the LSAM data store. |
| Customer profiles are to be sourced to and managed by core. | No customer profile data is maintained in the LSAM. Refer to the LSAM local data description for more details on the data entities stored in LSAM. |
| Network element data required to support customer care are to be maintained in the core customer profile. | No network element data is maintained in LSAM. |
| Network element data not required for customer care are to be stored in LSAM. | Service Activation rules are maintained in a rules repository 240. Tables supporting Service Activation data will reside in an Oracle database supporting function like connectivity decisions. |
| Transaction data are to be stored in LSAM in a format abstracted from LSOG versions and LSP specific requirements. | The SRP translates the requests into an abstracted LSOG version 3 format and the request is stored in this format until competed. |
| All data, including business rules, are to have one and only one source. | A single copy of business rules is maintained in the LSAM rules data repository 240. |
| LSAM exposes local processing capabilities through a set of well defined system interfaces: | |
| Interfaces are to be defined at fundamental data levels. | Interfaces are defined through message definitions using TAG attribute value pairs. |
| Interfaces are to reduce latency between Integrated Order Taker functions and LSAM processing. This ensures that changes are driven by the status of relevant work orders. | The SRP engine 202 is designed for high capacity transaction processing so that IOT can request and process information from LSAM in a real-time manner. |
| Clearly defined LSAM interfaces are to transfer information back and forth between core systems and LSP systems. | The LSAM System Interface defines the structure and the content of the dialog between the NSP core systems and the LSAM. This interface describes not only the standard API for information to be sent to LSAM but also the responses from LSAM. |
| LSAM is an integrated system with a common technical architecture: | |
| LSAM components are to be tightly integrated with each other, and loosely coupled with core systems. | The LSAM system components are tightly integrated with each other via a common messaging and execution architecture. These components interface with both the NSP core applications and the LSPs in an asynchronous manner and are isolated tbrough a technical protocol layer. |
| Pre-order and product availability data are to be cached when possible. | The LSAM Local Data Store maintains a local cache 245 of information that can be used by the NSP core applications to expedite processing. Specifically, telephone numbers (TN) and "due date" data. |

-continued

| NSP Guiding Principles | LSAM Solution |
|---|---|
| LSAM is to be responsible to ensure data availability to achieve desired order flow-through. | The LSAM data store uses a sophisticated database management system to ensure data integrity and availability. |
| LSAM is to interact with LSP2 as a "Friendly LSP." Utilize Gateway interface approach. LSP2 is to be able to re-use LSAM core architecture and business rules for its interconnection requirements. | The first release of LSAM enables interaction with LSP1 and LSP2. LSP2's "friendly" status enables sophisticated business rule development that help optimize LSP2 interactions. The LSAM object oriented architecture promotes reuse. The LSP2 interface should conform to the appropriate OBF, TCIF, and LSOG standards. |
| LSAM is to minimize dependencies on LSPs whenever possible. Necessary data is to be available within LSAM to support transactions once they are received. | LSP specific processing is isolated within the LSAM Command Processor. Front-end/core applications is shielded from LSP specific processes and data requirements. |

LSAM Functional Overview

LSAM is architected not only according to the guiding principles above but also to address the NSP's local service entry business requirements. There are several 'going-in-position' requirements which LSAM must address.

The LSP maintains independence from the core system. As the NSP enters into local markets it will roll out the LSAM solution to a wider geographical area and across several local service providers. Implementation of the LSP interfaces vary across LSPs and could also differ across geographical boundaries. For example, a specific public interfaces for a first LSP (LSP1) may vary state-by-state due to the local and state regulations. Similarly, the public interface for LSP1 and a second LSP (LSP2) will probably not be identical. Since the LSP interfaces directly impact how service is ordered, LSAM isolates the core NSP systems (the NSP core) from LSP interface variations.

The LSAM provides service activation connectivity independence. In addition to the LSP regional variations, the NSP core systems must also be isolated from the specific connectivity business rules that govern how local service is provisioned. For example, the NSP may want to leverage the LSP2 infrastructure to provide local switching in areas where it is available and only provide the loop from the LSP. In other areas, it may decide to re-sell the loop as well as switching from the LSP. Provisioning rules will vary by geographic area and may be based on a number of criteria such as 'wire center' or national pricing agreement (NPA-NXX). LSAM has the flexibility to implement and tailor these other rules without affecting the NSP core systems.

The LSAM provides fallout management. LSAM must also provide the ability to process certain actions in case of error or fallout. The system must provide the flexibility to take these actions either automatically or manually. For example, if an LSP experiences technical difficulties in its gateway but is processing orders internally, it may choose to send completions either via fax or e-mail. The NSP must be able to update LSAM appropriately and trigger completion processing. Similarly, the NSP should be able to handle a situation if an order was not completed exactly as requested but the customer has been provided with service. In each of these cases, LSAM isolates the NSP core from the complexities of the LSP ordering process.

The LSAM implements a local cache. LSAM must also facilitate the ordering process by assisting the NSP core systems to accurately create a service request for transmission to the LSP. The application architecture should support the development of additional local cache capabilities as supported by LSP interface agreements. LSAM should include processes to keep the Pre-Order Local Cache current and as accurate as possible.

The LSAM provides performance monitoring. Service level agreements are a key tool to ensure that the NSP can provide local service in a reasonable time and at a reasonable cost. Since LSAM is a single logical interface to all LSP's, it monitors and reports on service levels/metrics for the LSP's and LSAM itself.

The LSAM provides proactive status monitoring. LSAM monitors transactions against transaction level service agreements. This includes times for order confirmation and completion notification. Based on the NSP defined rules, LSAM recognizes jeopardies and pending or missed due dates. The application will spawn jeopardy notifications which can be processed as transaction responses and forwarded proactively to the NSP core systems. This facility can also support status inquiry and jeopardy reporting.

FIG. 2 also shows the key functional components of an LSAM solution and how they are integrated to provide a complete solution. The following sections describe these components in more detail.

LSAM System Interface

The LSAM real-time interface 230 to core NSP systems is defined through an API. This interface describes how the NSP core systems communicate with LSAM. The interface is designed for fast, high volume processing and will define the technical protocol, message structure, and the content descriptions. The LSAM interface will normally not need to be modified even when new products and services are rolled out. The addition of new LSP's will not impact the real-time interface to the NSP core systems. In addition, this interface will define the atomic level functions that can be performed through LSAM from an NSP core system perspective. Based on the request-for-proposal (RFP) requirements, the following types of functions may be included in the LSAM solution The pre-order function enables the core systems to perform pre-order transactions necessary to negotiate a service request, such as checking the availability of facilities or reserving a telephone number.

The service request processing function can be used to: (a) direct pre-order requests to local cache data stores, (b) validate service order and pre-order requests, (c) determine provisioning/connectivity solution for a given order, (d) translate service requests into LSOG internal formats, and (e) prepare and format transactions for LSP submission.

The request service response definitions can be used to define response functions for both pre-order and ordering transactions. The status request function can enable the NSP core systems to request the status of any request in process. Alternatively, LSAM may "notify" the NSP core systems of status or as a jeopardy situation approaches.

This interface enables effective isolation of the NSP core systems from the business rules that define how a service is being provisioned, e.g., unbundled network element-loop (UNE-L) and unbundled network element -platform (UNE-P) as well as the LSP interface variations.

Some NSP systems may wish to integrate with LSAM through a custom LSAM interface wrapper so that they can transmit requests and receive responses from the standard LSAM interface. A wrapper allows NSP systems to communicate on a non-standard basis with LSAM.

Service Request Processor

The service request processor (SRP) 202 is a transaction processing engine with custom software components that receive, manage and process requests from the NSP core systems in the LSAM real-time interface format. This engine is designed for high performance in order to support online inquiry and ordering processes and systems. The SRP performs several functions as described below:

Request Receipt and Validation

The SRP 202 receives requests, logs them and validates them to ensure the completeness and accuracy of the message structure. It then validates the completeness of the request content. The request content is also validated to understand the request type and the request destination. If either of these validations fail, an error is sent back to the sending systems, otherwise an acknowledgement of a successful receipt is sent. At this time, the request is assumed to be valid and is ready to be acted upon.

Request Processing

If the request can be satisfied locally (i.e., by the local pre-order cache), SRP 202 will perform the needed action and return the response to the sending system (for example, if an NSP core system needs to find out the status of an order and if the order is in process and not yet complete, SRP 202 can respond to the status request based on the information available in LSAM).

Depending on the type of request, SRP 202 will apply the necessary business rules to further refine the request. For example, depending on the numbering plan assignment NPA-NXX (or wire center or a specific criteria), a different type of LSP order may need to be generated (i.e., UNE-P or UNE-L). If the request results in a UNE-L type of order, the SRP will create multiple sub-orders, including one to request the loop and the other to request the switch port.

Figure 3:
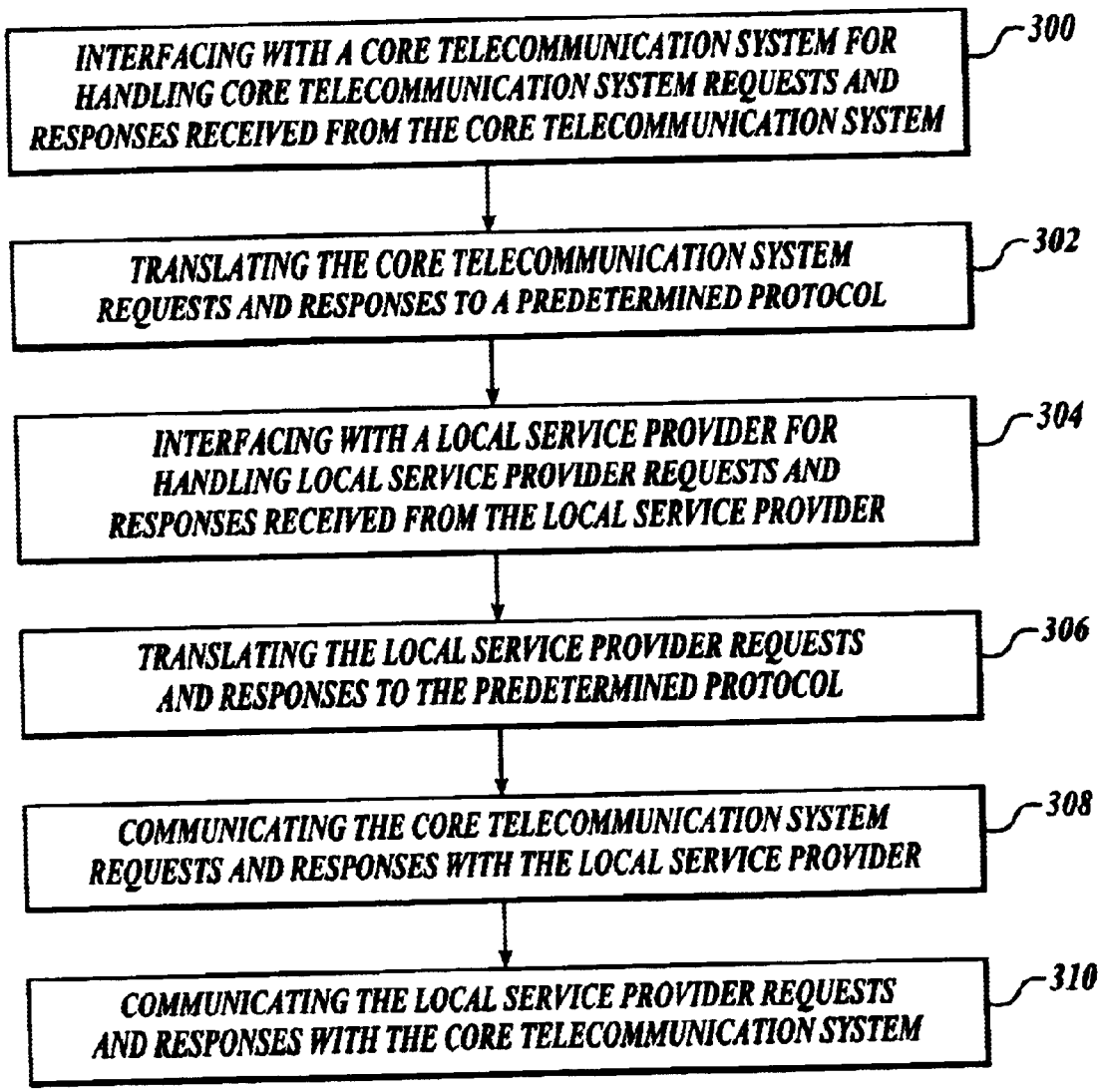
FIG. 3 is a flowchart illustrating a method for providing a management interface between a core telecommunications system and a local service provider.

FIG. 3 illustrates an overall manner of interfacing a core telecommunication system with a local service provider, as implemented by the components of FIG. 2. In operation 300, an interface with a core telecommunication system is provided to handle core telecommunication system requests and responses received from the core telecommunication system. The core telecommunication system requests and responses are then translated to a predetermined protocol, to a modified request and response, in operation 302. Also provided is an interface with a local service provider for handling local service provider requests and responses received from the local service provider. See operation 304. In operation 306, the requests and responses from the local service provider are translated to the predetermined protocol. The core telecommunication system requests and responses are communicated to the local service provider in operation 308. Requests and responses of the local service provider are communicated to the core telecommunication system in operation 310.

As an option, the requests and responses may be logged upon receipt, such as by storing them on some type of storage medium, e.g., disc, magnetic tape, etc., as shown in FIG. 1. Also optionally, the completeness of the requests and responses may be verified upon receipt. In such case, an error message may be generated upon one of the requests not being complete. Pre-ordering duties selected from the group consisting of address validation, feature verification, due-date reservation, telephone number reservation, and customer service record retrieval may be handled. Also, errors may be managed in real time.

Translator

The requests that need to be sent to the LSP are then converted to the internal LSAM (LSOG) format. The rules for this translation are maintained in a table driven configuration provided by a product such as QConnect. This function is supported by QConnect's translation process.

Response Processing

Responses received from LSPs (via the LSAM response processor) are logged and reviewed for specific detail necessary to understand the response status, e.g., Completed OK, Partially Complete, Error etc. Depending on the business rules associated with the response type, the response can be forwarded to either the receiving NSP core system or to the fallout/error management application, located in the on-line transaction controller 206, or to both. Responses sent to the NSP core systems are in the LSAM real-time system interface format.

Figure 4:
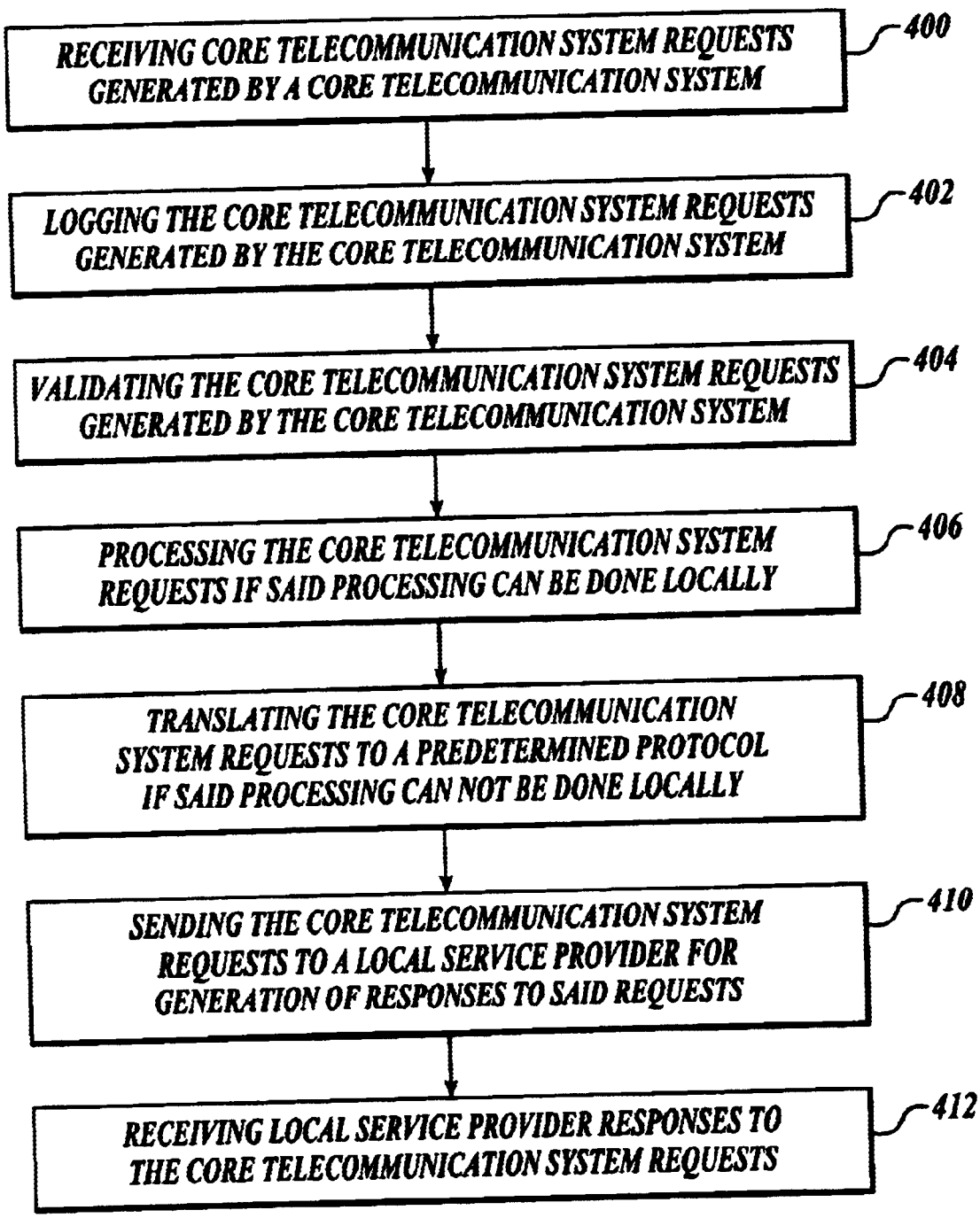
FIG. 4 is a flowchart depicting a method for service request processing in a local service activation management environment.

FIG. 4 is a flow chart of the service request processing in a local service management environment that is performed by the service request processor 202 (FIG. 2). In operation 400, core telecommunication system requests generated by a core telecommunication system are received by the LSAM. The core telecommunication system requests generated by the core telecommunication system are logged in operation 402. The core telecommunication system requests generated by the core telecommunication system are validated in operation 404. The core telecommunication system requests are processed in operation 406 if the processing can be done locally. The core telecommunication system requests are translated to a predetermined protocol if the processing can not be done locally in operation 408. In operation 410, the core telecommunication system requests are sent to a local service provider for generation of responses to the requests. In operation 412, local service provider responses to the core telecommunication system requests are received.

As an option, an error message may be generated upon failure of the validation of the core telecommunication system requests generated by the core telecommunication system. Preferably, a content of the core telecommunication system requests generated by the core telecommunication system are validated. More preferably, an error message is generated upon one of the core telecommunication system requests not being complete. Also, a status of the local service provider responses may be determined. Further, the local service provider responses may be sent to either the core telecommunication system or a fault management application based on the status.

Fallout/Error Management

The fallout/error management component 206 (FIG. 2) allows system administrators to monitor and fix simple errors in the LSAM processing. This includes validation errors and requests that may fall out of the normal process flow due to any reason. In the normal processing model, errors should be fixed at the source and the request resent to the component which caused the failure. Hence this component does not provide a sophisticated editing facility but allows the request to be put back into the process flow via simple field updates performed by the system administrators. This component can also be used to facilitate processing of orders in case of errors in the LSP responses. For example, mass edit and resend.

Performance Management and Reporting

The LSAM components collect specific performance level metrics (to be finalized during a feasibility analysis phase) and log them into the LSAM Reference Data Store. This components above provides a basic viewing and reporting capability using an off-the-shelf third party reporting package. A limited number (10–15) of standard reports may be provided that allows the LSAM system administrators to monitor Service Level related information.

Figure 5:
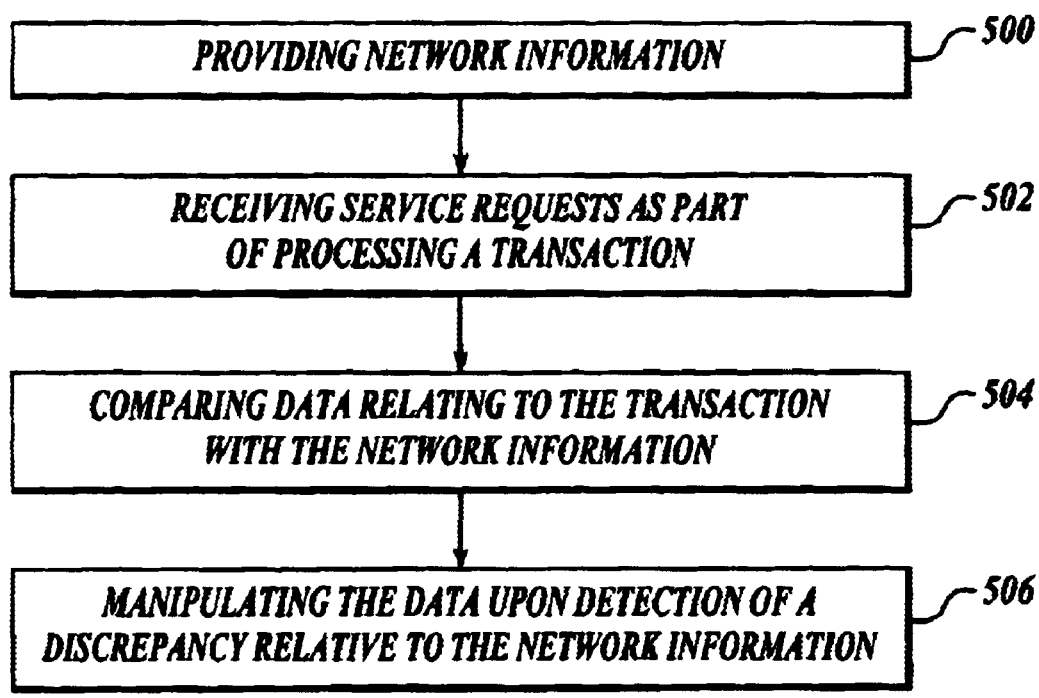
FIG. 5 is a flowchart illustrating a method for on-line transaction control during activation of local telecommunication service.

FIG. 5 is a flow chart depicting a method of validating service requests. First, network information is provided in operation 500. Then, service requests are received in operation 502 as part of processing a transaction. Data relating to the transaction is compared with the network information in operation 504. In operation 506, the data is manipulated upon detection of a discrepancy relative to the network information. Preferably, the network information is stored in a local cache. The manipulation of the data may be carried out on-line or in real-time. The data is sent out upon manipulation. Preferably, the data includes at least one of rules, references, and individual transaction data.

Command Processor

The command processor 204 (FIG. 2) provides the interconnection between LSAM and the LSPs. It mediates between the industry standards models implemented by the standard interconnection applications such as QConnect and the specific mechanisms utilized by each LSP. The command processor exchanges messages with the service request processor 202, which are governed by the relevant industry standard. The command processor exchanges messages with LSPs in a protocol and format prescribed by a joint implementation agreements (JIA). The joint implementation agreement is an agreement between the LSP and the LSAM to provide specific protocols and formats.

In fulfilling its role of translator between the SRP and the LSP, the command processor must perform duties such as receive, log, translate and validate messages from the SRP LSPs, as well as connect, authenticate, and communicate with LSPs. The CP 204 will also launch new business transactions based on configurable business events, associate messages with running business transactions, detect, report, respond, and manage exception events and communication interface events.

LSAM requires interconnection applications such as pre-ordering and local ordering. Industry standards specified by the "Alliance for Telecommunications Industry Solutions" (ATIS) which determine the business models implemented by the command processor's interconnection applications require pre-ordering, ordering and billing forum (OBF) (Local Service Ordering Guidelines version 3) and local ordering, ordering and billing forum (OBF) (Local Service Ordering Guidelines, version 3). The LSAM may provide LSP interfaces such as LSP1 (North), pre-ordering electronic data interchange (EDI), common object request broker architecture (CORBA), ordering—EDI, LSP2, pre-ordering, and ordering.

Pre-Ordering is a business function which allows competitive local exchange carriers (CLECs) to gain the information required to place an accurate order to an incumbent local exchange carrier (ILEC). Pre-ordering functions include address validation, feature verification, due-date reservation, telephone number reservation, and customer service record (CSR) retrieval.

The ordering interface is used to allow carriers to order services or unbundled network elements (UNEs) from other carriers, and includes new features such as local number portability. Typically, CLECs order telecommunication service request (TSR) services or UNEs from ILECs. Services ordered include Plain Old Telephone Services (POTS) and designed services (Centrex, DS1s, etc.). UNEs ordered include unbundled loops, switch ports, and trunking facilities. Another facet of ordering is provisioning. Specifically, provisioning functions include order jeopardy notification, order status, firm order confirmation (FOC), order completion notification, and order rejection notices. These functions are considered important for providing the CLEC with current information on the status of their end customers' orders, and are typically contained as part of the ordering interface.

Figure 6:
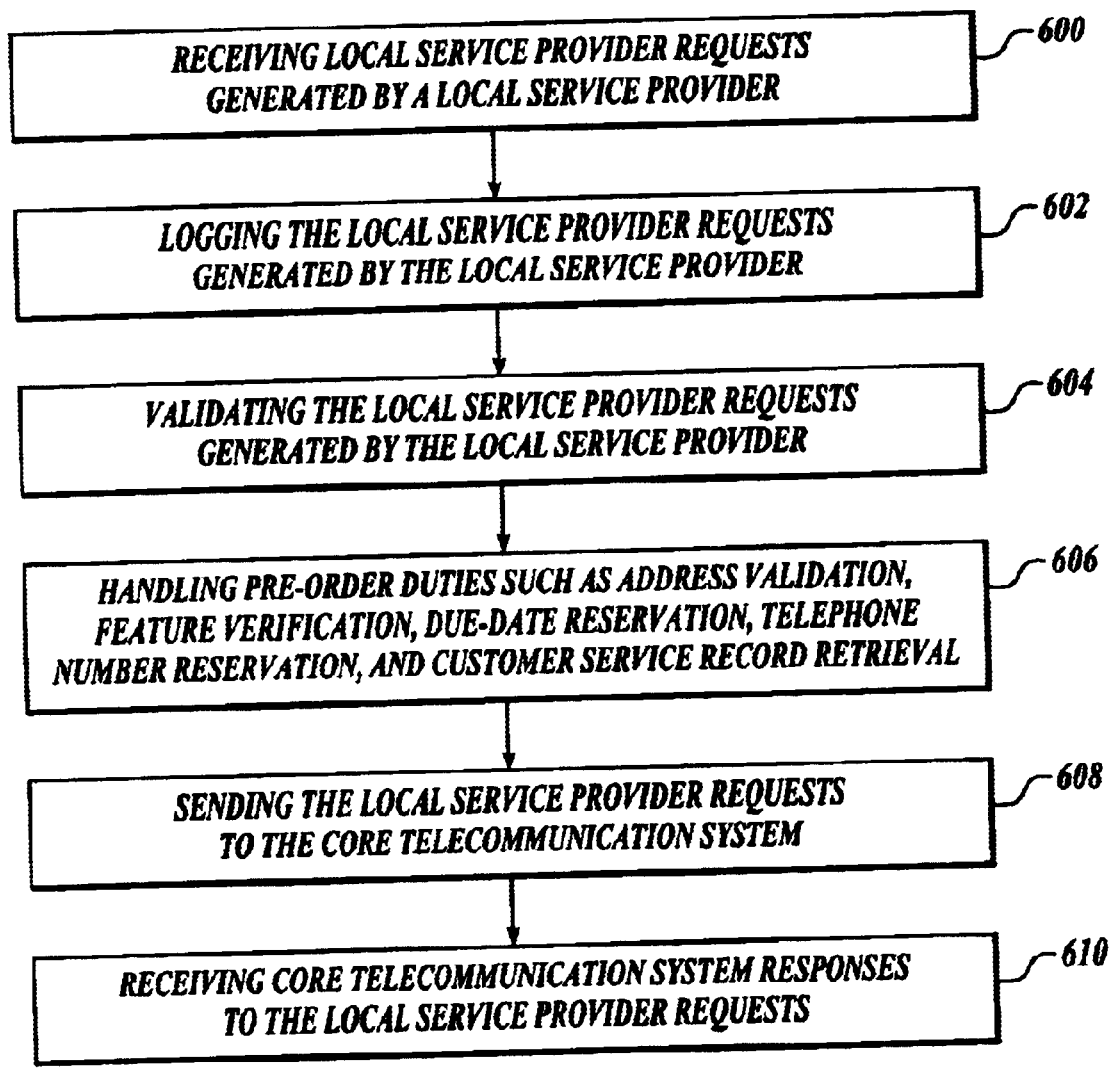
FIG. 6 is a flowchart illustrating a method for providing a management interface between a core telecommunications system and a local service provider.

FIG. 6 is a flow chart of the operation of the command processor 204 set forth hereinabove. In use, the command processor 204 interfaces with a local service provider for management purposes. In operation 600, requests generated by a local service provider are received, which are logged in operation 602 and validated in operation 604. Pre-ordering duties selected from the group of pre-ordering duties consisting of address validation, feature verification, due-date reservation, telephone number reservation, and customer service record retrieval are handled in operation 606. The local service provider requests are sent to the core telecommunications system in operation 608. In operation 610, the core telecommunication system responses to the local service provider requests are received.

Preferably, an identity of the local service provider is authenticated before processing of the request. Also preferably, local service provider requests generated by a plurality of local service providers are received, logged, and validated. Optionally, business transactions may be launched based on business events that are detected. Messages may be associated with the business transactions. Ideally, the local service provider interprets responses for event handling purposes.

LSAM Data Architecture

The LSAM data store consists of the following entities: TN (Valid, In Use and Available), Request Log (Status, Due Dates/Time, Origin, Destination), Performance Management Data (Summary of Service Levels Missed, Service Levels Exceeded etc.) LSP (Detail info on each LSP, contacts, service-level agreements (SLAs)—interface commitments, due date commitment etc.), Business Rules (Validation rules, exception rules), CSP and CP data stores.

Data Load and Archive

General load and archiving functions can be executed as a periodic batch job, such as nightly or weekly. Telephone number (TN) and a street address guide (SAG) request may be generated in a batch mode and a transaction file that contains these requests can be sent to the LSP using a file transfer mechanism (e.g., "Connect: Direct" or network data mover (NDM).

Subsequently, the LSP generates the requested data (TN and SAG) into a file which is sent to the network service provider (NSP) LSAM in a batch mode using a file transfer mechanism. These files when received from the LSP are validated and loaded into LSAM databases. A script that manages the data load may be scheduled and controlled by a batch scheduler (e.g., Control-M or Autosys).

Data archiving can also be done in batch mode. The data archiving batch job may be scheduled in accordance with the business requirements that can be confirmed in the general design phase. Data that is archived moves to the NSP's standard storage media.

Description of Interfaces

Figure 7:
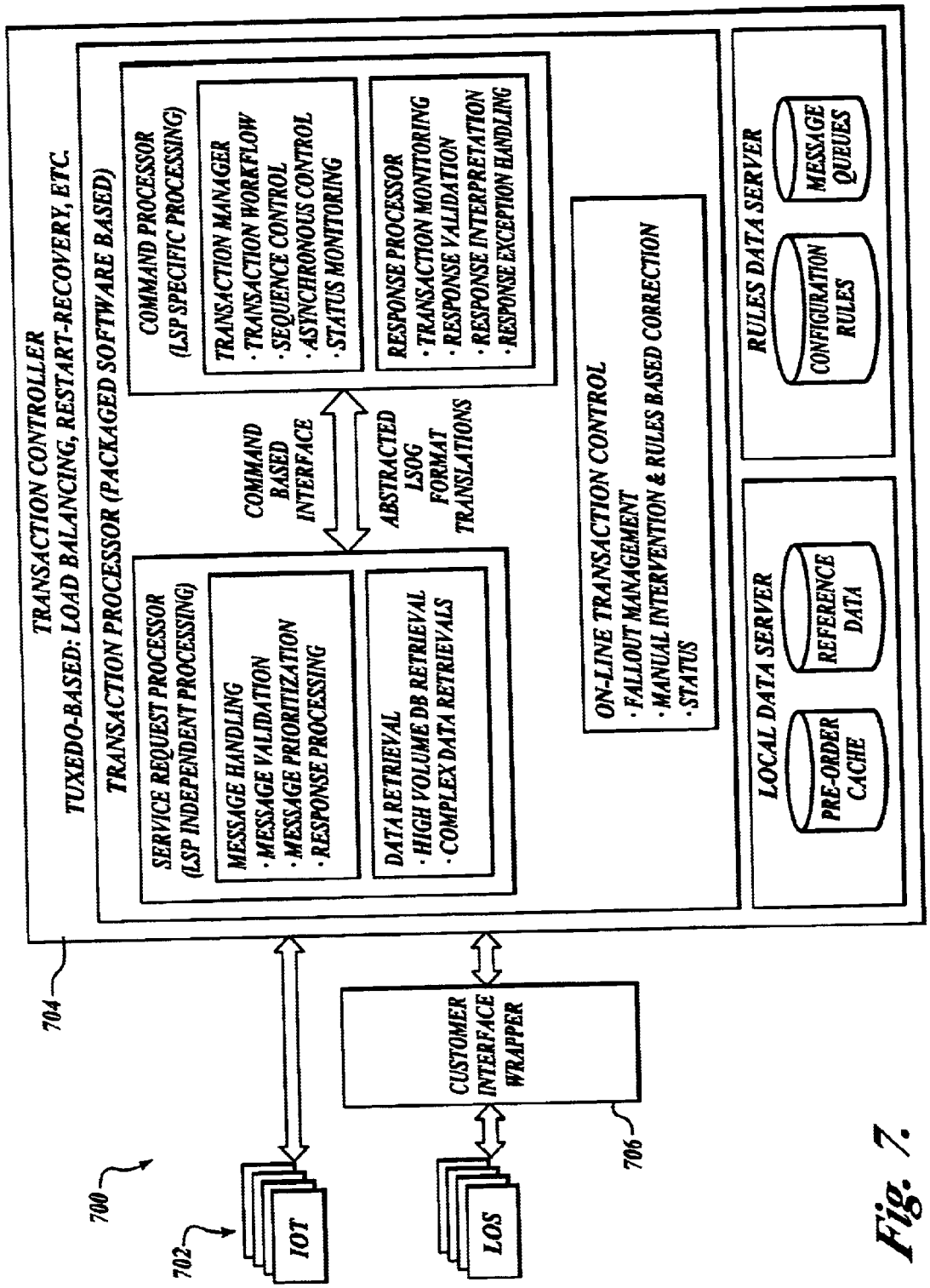
FIG. 7 is an illustration particularly depicting interfaces between the core telecommunications system and the transaction controller in accordance with one embodiment of the present invention.

FIG. 7 illustrates one implementation of the present invention with an interface 700 between a core telecommunications system 702 and the transaction controller 704. In particular, a wrapper 706 is used to translate messages and responses to LSAM standard format, which will be described in detail hereinafter.

Figure 8:
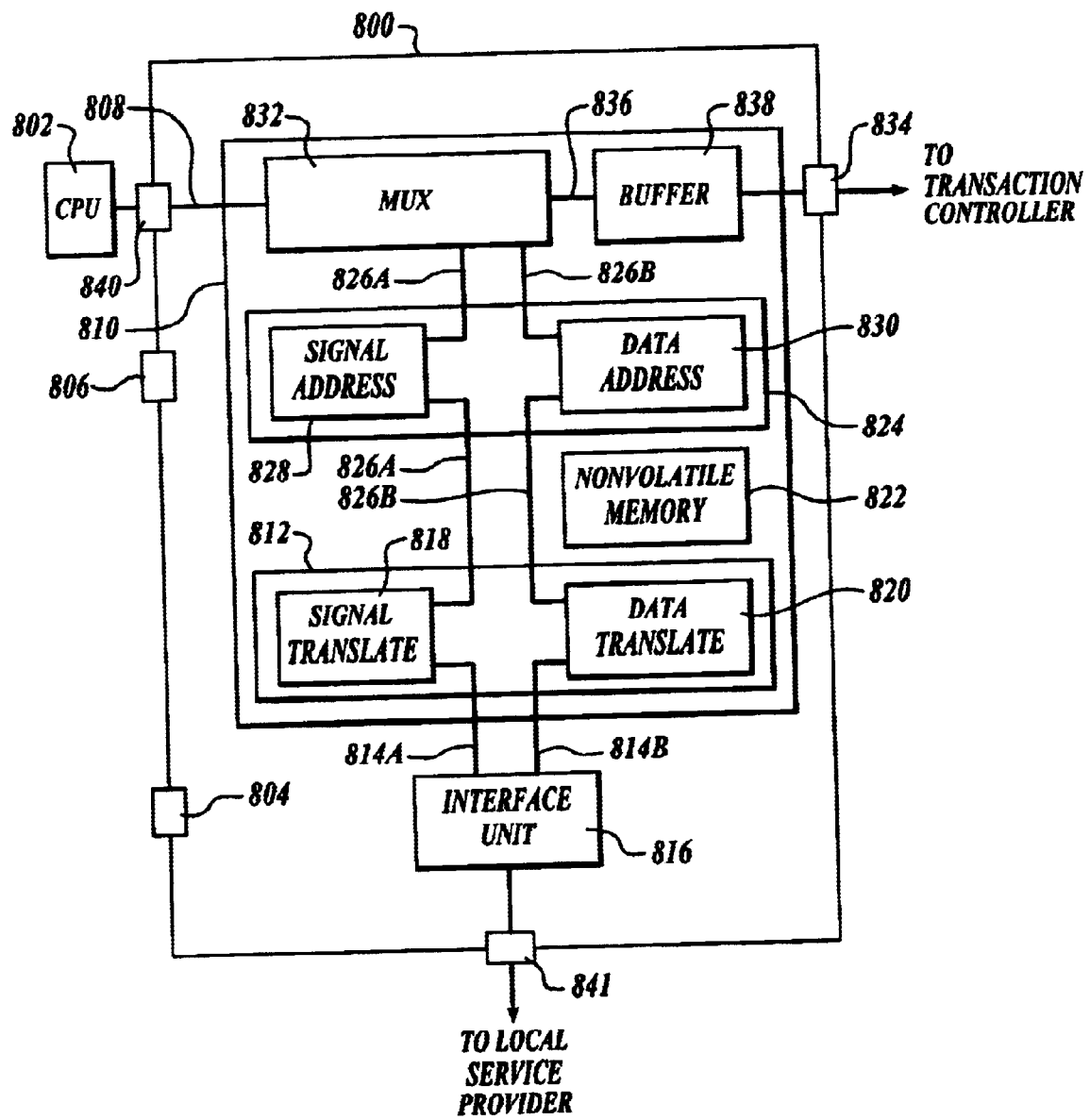
FIG. 8 is an illustration of an interface in accordance with one embodiment of the present invention.

FIG. 8 illustrates an exemplary embodiment of the interface shown in FIG. 7 of the present invention. The transaction controller preferably includes a computer of a type known in the art. Each of the interfaces includes a network interface card (NIC) 800 which is connected to a CPU 802 of the computer via link 808. Each NIC 800 has a power terminal 804 for receiving electrical power from a source that is independent of the power supplied by the power conversion unit in the computer, and also independent of the source providing power to the computer's power conversion unit, as shown in FIG. 8. This external source may, by way of illustrative example, comprise a separate, plug-in power supply for attachment to a standard duplex receptacle, an on-board rechargeable battery, or the −48V DC power supply typically employed in a public or private telephone system. The power selection and conversion unit 806 receives power from either or both of link 806 and terminal 804, and distributes the required power to the components of the NIC 800. Preferably, the interfaces support high priority synchronous and reliable asynchronous data transfer.

For the following discussion, the NIC 800 that interfaces the transaction controller 704 (FIG. 7) and the LSPs will be set forth. It should be kept in mind that the interface with the core telecommunications system operates in a similar or the same way. With continuing reference to FIG. 8, a detailed block diagram of the processing system 810 incorporated in the NIC 800 is there shown. The processing system 810 includes a translation unit 812 which communicates with the LSPs by exchanging information through a terminal device data interface 816. The translator unit 812 converts or re-formats the LSP data to the protocol required by the transaction controller, and also converts in the reverse direction, i.e. from the transaction controller protocol to the LSP protocol. The signaling information and the telephonic data are separated by the interface unit 816, and translated respectively by the signal translator 818 and the data translator 820. The interface unit 816 exchanges signaling information with the signal translator 818 via bus 814*a*, and it exchanges data (also known in the art as bearer) with the data translator 820 via bus 814*b*.

The signaling information and the telephonic data must be sent to destination addresses that are consistent with the design of the data network. With continued reference to FIG. 8, the processing system 810 must contain an initial data network address of the LSP, or some similar entity connected to the network, in order to establish communications with it. Accordingly, the processing system 810 contains an initial address of the controller. This address may be programmed into a non-volatile memory 822 at the time of manufacture of the NIC 800, or at the time the NIC 800 is installed. Subsequently, each time power is applied to the NIC 800, the processing system 810 can use the initial address stored in the non-volatile memory 822 to automatically establish communications without any reliance upon information contained in the computer attached at port 840. After the NIC 800 establishes communication with the transaction controller, the NIC 800 may receive further information from the controller instructing as to the destination addresses of the signaling information and the telephonic data that it is to transmit. Accordingly, an address unit 824 is provided which receives the translated data from the translation unit 812 via an internal bus 826. The address unit 824 adds the destination addresses of the destination or receiving devices via a signaling address unit 828 and a telephonic data address unit 830.

Once the LSP data is translated and the addresses of the destination devices have been determined, the data is provided to a multiplexer—demultiplexer (MUX) unit 832, which may be software or hardware driven, for combining the reformatted LSP data with outgoing data generated by a CPU. The combined data is then output for transmission to the processors. In other words, as the formats for the CPU data and LSP data have now been made consistent with each other and with the format required by the data network, the separate data signals can be multiplexed by MUX 832, in a manner well-known to those having ordinary skill in the art, for output via NIC output port 834 to downstream CPUs (i.e., the processors 202,204). In a preferred embodiment, a buffer 838 is included between the NIC output port 834 and the MUX 832 for receiving the multiplexed data from line 836 and for regulating the bit flow rate of data to and from the data network.

As explained above, the NIC 800 functions in a bi-directional manner. Thus, it is not only capable of outputting multiplexed data for transmission to the data network, but is also capable of receiving multiplexed data and forwarding the received data to either or both the CPU 802 and the LSPs. Such incoming data is processed in a reverse order relative to that described above. For example, and with continued reference to FIG. 8, incoming data is first received by buffer 838 and is then provided to MUX 832 for processing and separation. MWX 832 will separate the CPU destination data from the LSP destination data. The CPU destination data will be output via port 840 to data bus line (link) 808 for receipt by CPU 802. The LSP data will be converted from the data network format to the format required by the transaction controller via translation unit 812 and output from the LSP downstream port 841 for reception by the intended LSP.

The interface unit 816 which, as explained above, interfaces or connects the LSPs with the translation unit 812, also functions to convert the data generated and/or received by the LSPs to a format required by the translation unit 812. For example, telephonic data may be converted to a proper line format such as integrated services digital network (ISDN) wherein the data is divided into a signaling channel and bearer channel. In addition to the reformatting and separation functions described above, interface unit 816 may also perform analog to digital conversion functions for use, for example, if analog LSPs are connected.

The interface connected to the core telecommunications system should function in a manner the same as or very similar to the interface with the LSPs as set forth above.

In general, one embodiment may be to provide the basic pre-order capabilities of LSAM. In this embodiment, the LSAM supports TN selection, reservation and cancellation, service location validation, and due date negotiations. This embodiment could require the NSP platforms to submit service requests and to process the FOCs, CN, rejects, and failures through existing platforms. Pre-Order transactions could be routed to LSAM.

In another embodiment, the LSAM handles both pre-order and order functionality. The NSP customer care systems may then use LSAM to submit service requests and to process FOCs, CN, rejects, and failure responses. This embodiment would also support product availability and status inquiry functions. The LSAM would have the capability to support the end-to-end customer care functions required to add, change, and delete services. LSAM insulates the NSP customer care systems from the complexities of interfacing with LSPs.

The LSAM can support pre-order functionality. The three pre-order functions supported are TN administration, service location validation, and negotiation of due date/time. The TN administration functions allow the NSP to retrieve the list of available TNs at a certain service location, validate a customer requested TN (personalized or vanity TN), and support the reservation/cancellation of the selected TN. For new orders the service location will be the key identifier used by LSP1 to search for TN. For Change orders, the current TN will be the identifier sent to LSP1.

The service location validation functions validate the service location address with LSP1. The service location address is a key data entity for inquiring into available TNs from LSP1 as well as for ensuring that a successful interconnection will be supported between the LSP2 switch and the LSP1 loop. The due date functions allow the NSP customer service representative to negotiate the provisioning date with the customer. LSAM stores standard provisioning intervals which can be used when computing the due date. The standard provisioning intervals can be updated by scheduled data uploads or by table maintenance.

An exemplary list of transactions may include:

| Business Event | Description |
| --- | --- |
| ~RE-ORDER~ | |
| TN - Selection List - remote Personalized TN Vanity TN | Request a list of some number (e.g. 5) of alternate TNs to support the TN selection step of service negotiation. The TN, structure data transfer SDT-TN, switch identifier, or service location sent with the request will be utilized to designate which switches the TNs are to be supplied from. The SDT-TN (or TN of the service location's former customer) is supplied for new connects or the "to" portion of moves. The current TN is supplied for TN change scenarios and add lines scenarios. The supplied TN specifies the serving switch. Request alternate TNs from the LSP. A request to specify a specific TN that the customer desires. In this case, LSAM will check if the specific TN is available. If the specific TN is available, it will be placed under "soft" reserve; otherwise, the state of the specific TN will be returned. |
| TN - Reservation - remote | Reserve the TN(s) selected by the customer and release the other TNs on the list of TNs, so they can become available. More than 1 TN may be reserved or no TNs may be reserved. The TN will be reserved against the LSP during the first three releases. |
| TN - Cancellation - remote | Request cancellation of TN reservation. The previously reserved TN will be sent in this request. The cancellation of the service request will automatically cancel the TN reservation (i.e., a cancel TN reservation message will not be required when a service request is cancelled) Cancel TN reservation with the LSP |
| Due Date - request due date and appointment - local | Request the due date and appointment based on the content of the service request (e.g., requesting inside wire and jack work) and other required attributes (state of service location). Due date refers to due date and time. When an appointment is required, the appointment end date and appointment interval will also be supplied. Appointment end date refers to appointment end date and time. Due date and appointment will be required for service requests and trouble tickets. Due date and appointment intervals will be queried utilizing the product, LSP, NPA-NXX combination as the unique key. Request due date and appointment utilizing default due date processing within LSAM. |
| Validate Service Location - remote | Request validation of the customer provided service address. This request is used when the service address the customer provides must be validated. The request results in an address validation and return of the validated address, in the case of one match. Multiple matching will be supported in Release 1 and results in a list of candidate addresses being returned. Validate the service location against the LSP |

The following scenario further illustrate how LSAM may function in this embodiment. A customer decides to migrate from LSP1 to NSP local (UNE-L; LSP2). The NSP needs to perform certain pre-order validation steps. The NSP may need to validate the service location with LSP1 via LSAM. The validated service location address is sent to LSP1 when the migrate order is generated. LSP1 can use the service location to interconnect the LSP2 switch to their loop system. The service location identifies the correct LSP2 switch to LSP1. The service location address should also be validated with LSP2 to ensure that the a LSP2 has the capability to provide service for that address.

The customer's CSR data will not be retrieved via LSAM in this embodiment. For example, all NSP LSP2 customers could receive an offer for an identical product configuration. This business plan simplifies the processing requirements for local ordering system (LOS). For all migrate orders, LOS could send a transaction request to LSP1 to disconnect the customer from their switch (LOS could send the list of TNs to disconnect) and to perform the interconnect logic to LSP2 (service location would be utilized to identify network id). LOS would also initiate a message to the LSP2 provisioning system to provision the switch.

LSAM would also be utilized to derive the due date and time for the order. LSAM could store standard provisioning times for each product combination which can be used to compute the due date. For a migrate as-specified order, TN selection and reservation for new and change order logic should not be required. TN selection and reservation logic could be performed via LSAM.

Figure 9:
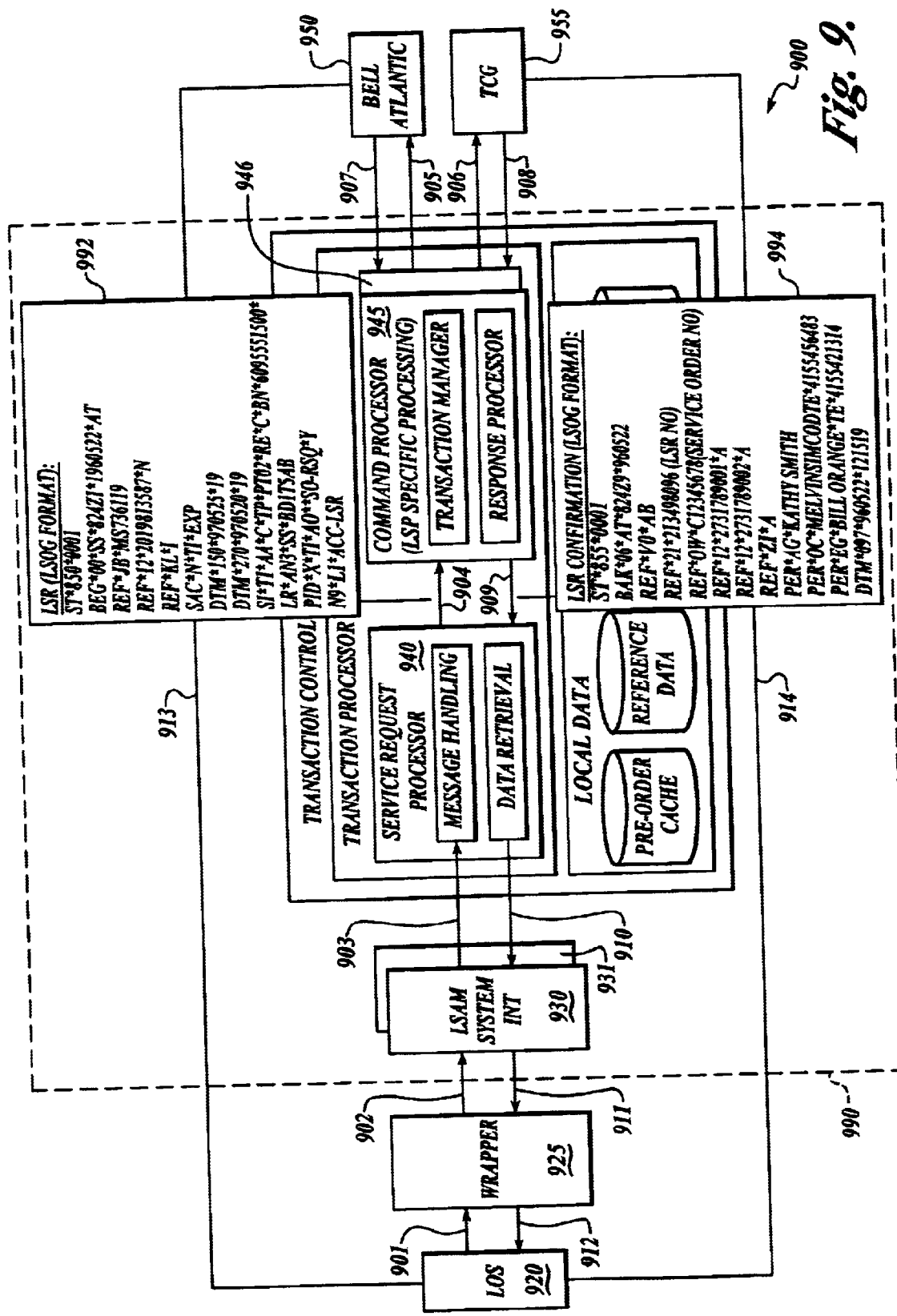
FIG. 9 is an illustration of an exemplary scenario flow for a service validation request.

FIG. 9 illustrates an exemplary scenario flow for a service validation request 900. The LOS 902 will submit the service location address request 901 to the wrapper 925. The wrapper 925 will perform standard transaction monitoring functions as well as perform simple validation. The wrapper will perform any required formatting and translation before forwarding the request 902 to the LSAM system 990. The LSAM system interface 930 will translate the request, utilizing a first translator 931, from the wrapper 925 or in IOT into standard LSAM terminology 992 and format. Once the request has successfully been translated and reformatted the request is forwarded 903 to the service request processor (SRP) 940. The SRP 940 will log the request and validate the completeness and accuracy of the message. The request type, destination, and content is also validated. For a service location validation request, SRP 940 will perform such logic as validating the state and zip code values. Requests that must be sent to a LSP are then converted to telecommunications industry forum (TCIF) format. Finally, the request is forwarded 904 to the command processor 945.

The message adapter component, such as Qconnect, within the command processor 945 will transmit the request to an LSP 905. Preferably, there will be one QConnect message adapter per LSP whose sole purpose will be to facilitate communication with a particular LSP. The request will be sent to LSP1 950. The QConnect message adapter component within the command process 945 may transmit 906 the request to another LSP. The request is then sent to LSP2 955.

The LSP1 950 will perform the service location validation and return the address if a single match is found, else a list of matches is returned. Assume a single match. The results of the request are sent back to the QConnect message adapter in TCIF format 907. The LSP2 955 will perform the service location validation and return the address if a single match is found, else a list of matches is returned. Assume a single match. The results of the request are sent back to the QConnect message adapter in TCIF format 908.

The command processor 945 will translate the LSP response, utilizing a second translator 946, into LSAM format 994, validate content, format, and completeness. The response 909 is then sent to the service request processor 940, which will log the response and determine the response status (e.g., OK, incomplete, error, etc.). The status of the response will determine whether the message is routed to the NSP or a Fall-Out manager. The successful service location validation response 910 is sent to the LSAM system interface 930. The LSAM system interface 930 will translate and reformat the response for transmission to the wrapper 925.

The wrapper 925 will do any necessary translation and route the response to LOS 920.

Once the service location and due date have been determined via transaction with LSAM 990, LOS 920 will submit the migrate order to LSP1 950. LSP1 950 will discontinue the customer from their switch and ensure that the identified LSP2 955 switch will have interconnection to the LSP1 950 loop. LOS 920 will also submit an order to the LSP2 955 provisioning system to activate services for the new NSP customer.

Figure 10:
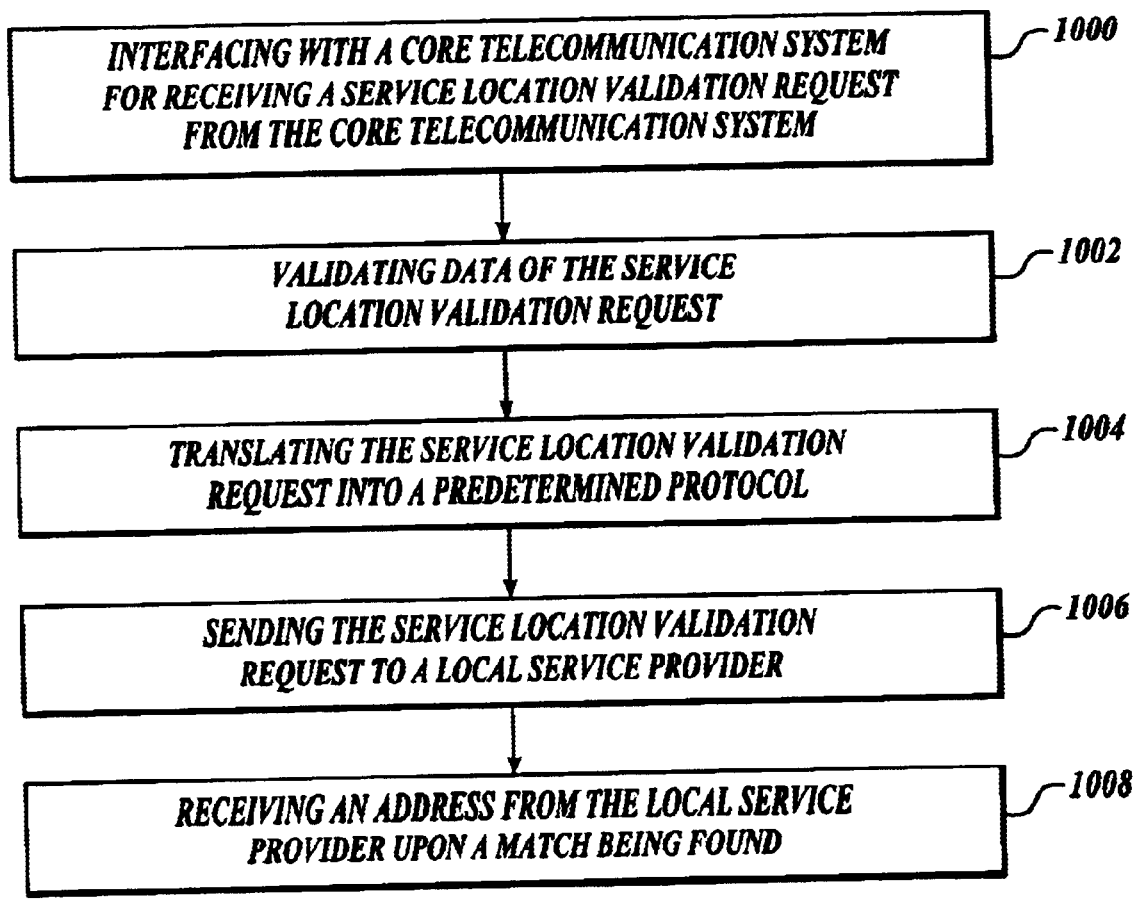
FIG. 10 is a flowchart illustrating a summary of the submission and handling of a service location validation request shown in FIG. 9.

In summary of the previous exemplary scenario flow for a service validation request shown in FIG. 9, FIG. 10 illustrates a process for submitting a service location validation request. In operation 1000, the transaction controller interfaces with a core telecommunication system to receive a service location validation request from the core telecommunication system. Data of the service location validation request is validated in operation 1002 and translated into a predetermined protocol in operation 1004. The service location validation request is sent in operation 1006 to a local service provider. An address from the local service provider is received upon a match being found in operation 1008.

As indicated hereinabove, the data may include either a zip code and/or state identifiers. Optionally, a plurality of addresses is received from the local service provider upon a plurality of matches being found. Also optionally, service for the address may be discontinued. Further, the address may be translated and/or logged after the receipt thereof.

Yet another embodiment of the LSAM builds upon the pre-order foundation previously described to support the end-to-end lifecycle for customer care. LSAM provides product availability functionality, empowering the NSP customer care system to perform product validation to minimize service request fallout. LSAM may also support the creation, inquiry, and completion of service requests.

Product availability functions can provide the NSP customer care systems with input data for its service negotiation process. The request service location configuration (CSR) function may provide a detailed view of the current active product configuration for a customer. The product availability function can provide a view of the network capabilities at a specific service location. The current product configuration and product availability view of a service location may be the primary inputs when validating a new service request.

Once the pre-order and product availability functions have been performed, a new service request can be created. LSAM supports the following service request types: new, migrate as specified, change, and disconnect. All migration type orders can be supported by the "Migrate As Specified" message. LSAM also supports the lifecycle maintenance and inquiry of pending service requests. The submitted service request can trigger a firm order confirmation, failure, reject, jeopardy, and completion notification. LSAM logs the various details of each message before sending the transaction to the NSP (e.g., status update, delivery time, etc.). LSAM also supports the inquiry function for a pending service request, enabling the customer service representative to communicate the latest status of the order to the customer. Finally, LSAM may allow the cancellation of pending service orders. Modification to the pending service requests will be supported by LSAM by use of a cancel/create strategy. The cancel/create logic will be transparent to the customer care system. The cancel/create strategy significantly simplifies process logic and work effort.

This embodiment may provide access to LSAM's fallout manager. Service request experts would utilize the system to perform "force cancel" and "force complete" status changes.

Various reports to summarize the performance of the system can also be included (e.g., volume of transactions, volume of errors, errors by LSP, errors by type, time required to handle request, etc.).

An exemplary list of transactions includes:

| Business Event | Description |
| --- | --- |
| ~PRE-ORDER~ | |
| Request Service Location Configuration (CSR) | Process the CSR request and retrieve the CSR from the LSP. |
| Product Availability | Based upon the TN or service location this message will return the service location configuration. This information includes details around active (provisioned) ports at the service location as well as inactive ports wired to the service location. Additional information (e.g., switch type, equipment type) can be utilized by the customer care system to determine the product(s) (e.g., standard vs. deluxe voicemail) that can be supported at a particular service location. The information for this transaction will be returned from the LSP. |
| LD Availability | Based upon the TN or service location, this message will return the list of long distance carriers that support a particular service location. The long distance availability data will be utilized by the customer care system for PIC selection. The information for this transaction will be returned from the LSP. |

| Business Event | Description |
| --- | --- |
| ~ORDERING~ | |
| Create - New | This message is used to activate service for a new customer who currently does not have local service. The appropriate service requests will be sent to the LSP(s). |
| Create - As specified | This message is used to migrate a customer who currently has local service provided by a LSP. This message will be utilized for customers who want to change their service profile during the migration as well as for customers who will be transferring without any service changes (Migrate As Is). The use of the As Specified message for both scenarios will simplify/reduce processing logic while fully supporting the migration requirements. The migration request will be sent to the LSP. |
| Create - Change | This message is used to change an existing NSP customer profile. The changes can include record and product modifications. The various changes will be sent to the LSP. |
| Create - Disconnect | The disconnect message is used to discontinue all related services for a TN for an existing customer |
| Reject Notification | The LSP sends notification that the transaction has been rejected and must be re-submitted after being corrected. This message is sent to LOS for correction and resubmission to LSAM. |
| Failure | The LSP sends notification when a service request has failed during the provisioning process. This message is sent to LOS for correction of the service request and resubmission to LSAM. |
| FOC - no reverse translation, only TN/DD | Receive the firm order confirmation notice from the LSP and update the status on the tracking DB. Update the due date as required. Send the details of the firm order confirmation to the retail customer care system. |
| JEP | LSP sends jeopardy notification that a service request may not be completed by the agreed upon due date. This message is sent to LOS. |
| Completion | Receive the completion notification from each LSP, update status on tracking DB, determine completion status of the entire order and send notification to retail customer care system. Completions will be transmitted as components when the service requests are completed. |
| Status of Pending | Request the details and status on a service order by decomposing the status requests and communication with each individual LSP. |
| Cancel Pending | A pending service request may be canceled by utilizing the cancel pending service request message. Any reserved TNs associated to the pending service request will be released. A pending service request may be canceled if and only if no work activity has been started on the service request. Route the cancel command to all LSPs that currently possess pending work for the specified service request. |

As an example, a situation where a customer that has just moved to a region has selected the NSP as his/her local service provider. The NSP customer care system will establish the customer and billing account before performing the pre-order and service request submission functions.

The NSP customer care system will perform the following pre-order functions via LSAM: service location validation, TN selection, and due date/appointment. The service location validation logic would be identical to the logic featured in the previous discussion. Additional interfaces will be added as an NSP expands its market coverage. The TN selection logic would allow the customer to choose a specific TN from a list provided by a LSP. Once the customer has chosen the TN, the reservation would be sent to the LSP. The customer will also have the option of creating a personalized TN. The personalized TN would also be validated with the LSP.

Once the customer has decided on his product configuration, the NSP will submit the service request to LSAM. LSAM will perform its standard translation, logging, and routing logic. In addition LSAM will perform a decomposition function to break-up the service request into its provisioning components. Each component will then be routed to the appropriate LSP. For example, provisioning a new access line might require provisioning activity by both LSP1 and LSP2 (LSP2 programs the switch, LSP1 provides loop connectivity). Status will be tracked and maintained at the component and master order level.

LSAM would also process status inquiries from the NSP. The type of status inquiry will determine whether LSAM will need to communicate with a LSP or simply query its internal status database.

Figure 11:
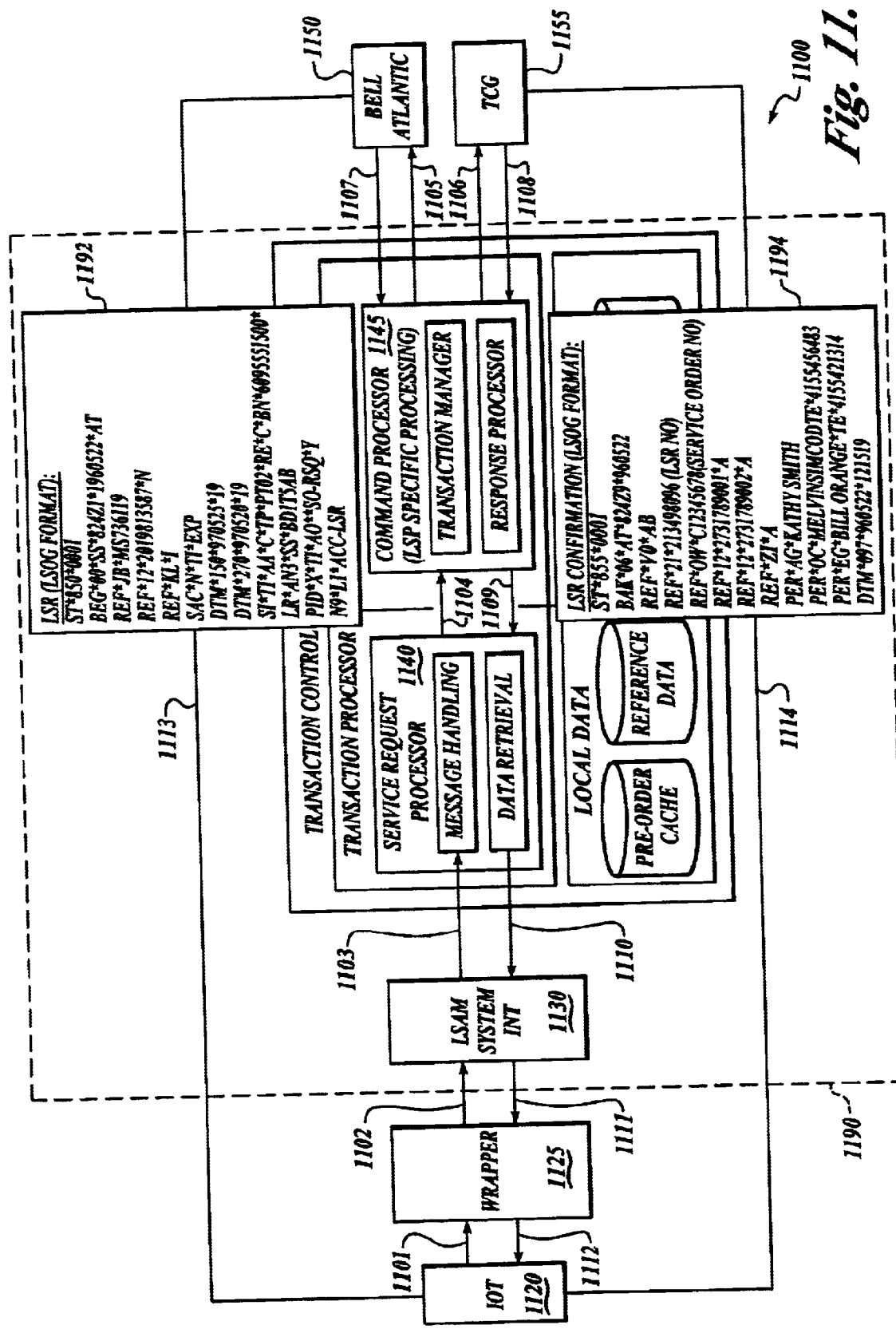
FIG. 11 is an illustration of an exemplary scenario flow for submission of a service request.

FIG. 11 illustrates an exemplary scenario flow for submission of a service request 1100. IOT 1120 may submit the service request 1101 to the wrapper 1125. The wrapper 1125 will perform standard transaction monitoring functions as well as performing simple validation. The wrapper 1125 will perform any required formatting and translation before forwarding the request 1102 to the LSAM system 1190. The LSAM system interface 1130 will translate the request from the wrapper 1125 or IOT 1120 into standard LSAM terminology and format. Once the request has successfully been translated and reformatted the request 1192 is forwarded 1103 to the service request processor (SRP) 1140. The SRP 1140 will log the request and validate the completeness and accuracy of the message. The request type, destination, and content is also validated. For a service request, SRP 1140 will perform such logic as validating that all custom calling features are associated to a TN. Requests that must be sent to a LSP are then converted to LSOG format. Finally the request is forwarded 4 to the command processor (CP) 1145.

A message adapter component, such as Qconnect, within the command processor will translate/format the transaction into telecommunication industry forum (TCIF) electronic data interchange (EDI) format before sending 1105 the transaction to an LSP1 1150. There will be one QConnect message adapter per LSP whose purpose will be to facilitate communication with that LSP. The request will be sent to LSP1 1150 to perform the loop/LSP2 switch connectivity.

The Qconnect message adapter component within the Command Process will translate/format the transaction into telecommunication industry forum (TCIF) electronic data interchange (EDI format) before sending the transaction to an LSP2 1155. The request will then be sent to LSP2 1155 to activate the appropriate services. p The LSP1 1150 will process the service request. The LSP1 1150 will first send back the FOC after validating the service request 1107. After completion of the provisioning activity, the completion notification (CN) message will sent. Both the FOC and CN are sent to the QConnect message adapter in TCIF format.

The LSP2 will process the service request. The LSP2 will first send back the FOC after validating the service request 1108. After completion of the provisioning activity, the completion notification message will be sent. Both the FOC and CN are sent to the Qconnect message adapter in TCIF format.

The CP 1145 will translate the LSP's responses into LSAM format 1194, validate content, format, and its completeness. The response is then sent 1109 to the SRP 1140. SRP 1140 will log the response and determine the response status (e.g., OK, incomplete, error, etc.). The status of the response will determine whether the message is routed to the NSP or the Fall-Out manager. The FOC and CN response are sent 10 to the LSAM system interface 1130. The LSAM system interface 1130 will translate and reformat the response for transmission 1111 to the wrapper 1125. The wrapper 1125 will do any necessary translation and route 1112 the response to the NSP.

Figure 12:
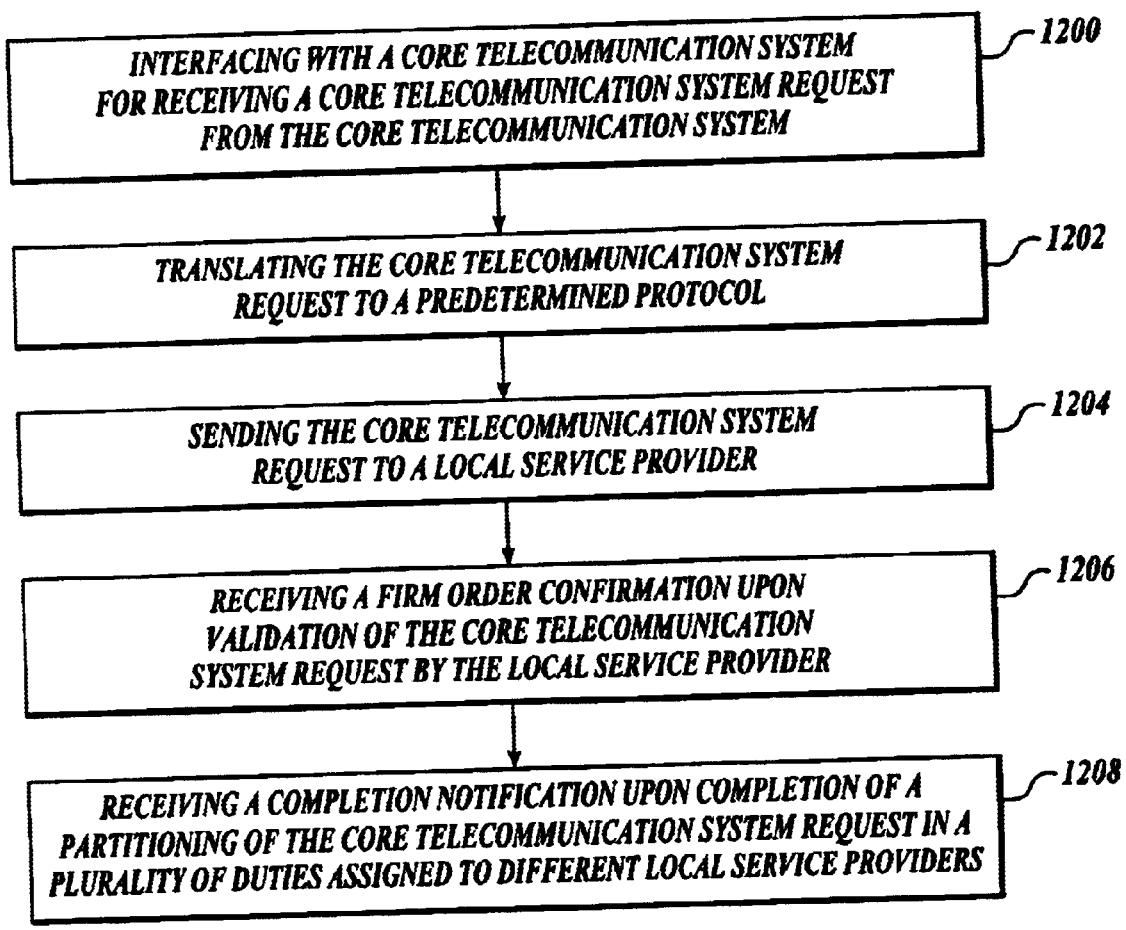
FIG. 12 is a flowchart illustrating a summary of the submission and processing of a service request shown in FIG. 11.

In summary of the above scenario flow for submission of a service request shown in FIG. 11, FIG. 12 illustrates a process for submitting a service request. In operation 1200, the transaction controller interfaces with a core telecommunication system for receiving a core telecommunication system request from the core telecommunication system. The core telecommunication system request is translated in operation 1202 to a predetermined protocol. In operation 1204, the core telecommunication system request is sent to a local service provider. A firm order confirmation is received upon validation of the core telecommunication system request by the local service provider in operation 1206. Finally, in operation 1208, a completion notification is received upon completion of a partitioning of the core telecommunication system request in a plurality of duties assigned to different local service providers.

Preferably, the firm order confirmation and the completion notification are translated upon receipt. Also preferably, the firm order confirmation and the completion notification are logged upon receipt. As an option, a customer account may be established prior to interfacing with the core telecommunication system. Further, telephone network selection may be allowed.

Service location validation may also be allowed. In such case, the transaction controller interfaces with a core telecommunication system to receive a service location validation request from the core telecommunication system. Data of the service location validation request is validated and translated into a predetermined protocol. The service location validation request is sent to a local service provider. An address from the local service provider is received upon a match being found.

Still another embodiment illustrates the functionality which may include trouble management, modify pending (supplemental) logic, and local cache street address guide (SAG) administration within LSAM.

The trouble management functionality would allow the NSP to diagnose the trouble ticket, negotiate a due date for the trouble ticket, and submit the trouble ticket to the LSP. LSAM may also support status inquiries, cancellations, and modifications of open trouble tickets. Network outages sent from the LSP(s) can also be routed through LSAM to the NSP. The NSP would then have the option of using the network outage information to proactively contact customers potentially impacted by the outage.

Modifying pending logic allows supplements to be made to already existing service requests. LSAM would handle the complex versioning and change logic required for modifying pending orders (supplements).

LSAM may have the capability to maintain the SAG database internally. LSAM would receive feeds containing the SAG information and various batch upload modules to ensure that LSAM SAG DB is current. The SAG database may be utilized when validated service location requests are sent from the NSP. The maintenance of the SAG database internally within LSAM should not impact the NSP customer care platform's service validation logic. The query process within LSAM may be modified (query internal DB vs. query to LSP), isolating the NSP from changes.

The LSAM platform has the capability to rapidly add new interfaces to additional LSP OSSs. Developing a new interface requires modification and enhancements to message adapter such as Quintessent message adapters. Implementation steps include mapping from LSAM common codes to LSP codes, developing protocol conversion rules, and defining generic translation rules.

LSAM Technical Overview

The LSAM system delivers an integrated technical architecture which shares common integrated technical architecture with shared services and features across the application. The LSAM provides a flexible architecture to support changing business requirements. It is made up of layered components that interface with each other through a well-defined set of internal interfaces. This creates the flexibility to support changing business requirements. The LSAM uses a productive development toolset which enables productivity and meets the needs of both subject-matter experts and system developers. It provides a software configuration which manages system changes in a controlled and predictable manner. The solution uses defined change, release, and migration control procedures during design, development, and production. A secure interaction between trading partners is provided by network and data security to ensure that transactions flow securely between trading partners. Multiple protocols independent of business transactions are implemented by business rules independent of both communication protocols and data format.

Integration into the NSP's system and network management environment is supported by interfaces that integrate into the NSP's existing network and systems management environment. These interfaces provide complete management capabilities and ensure that no part of LSAM is a "black box" to system administrators. In addition, high performance and scalability meet current and future transaction processing requirements as business volumes grow. Finally, mission critical processing supports many high-availability features such as no single points of failure or alternate routes to data and processing, errors may be logged or handled when they occur, and a recovery plan that specifies the roles, responsibilities, and tools that can be used to recover from system failures.

LSAM Runtime Execution Architecture

Figure 13:
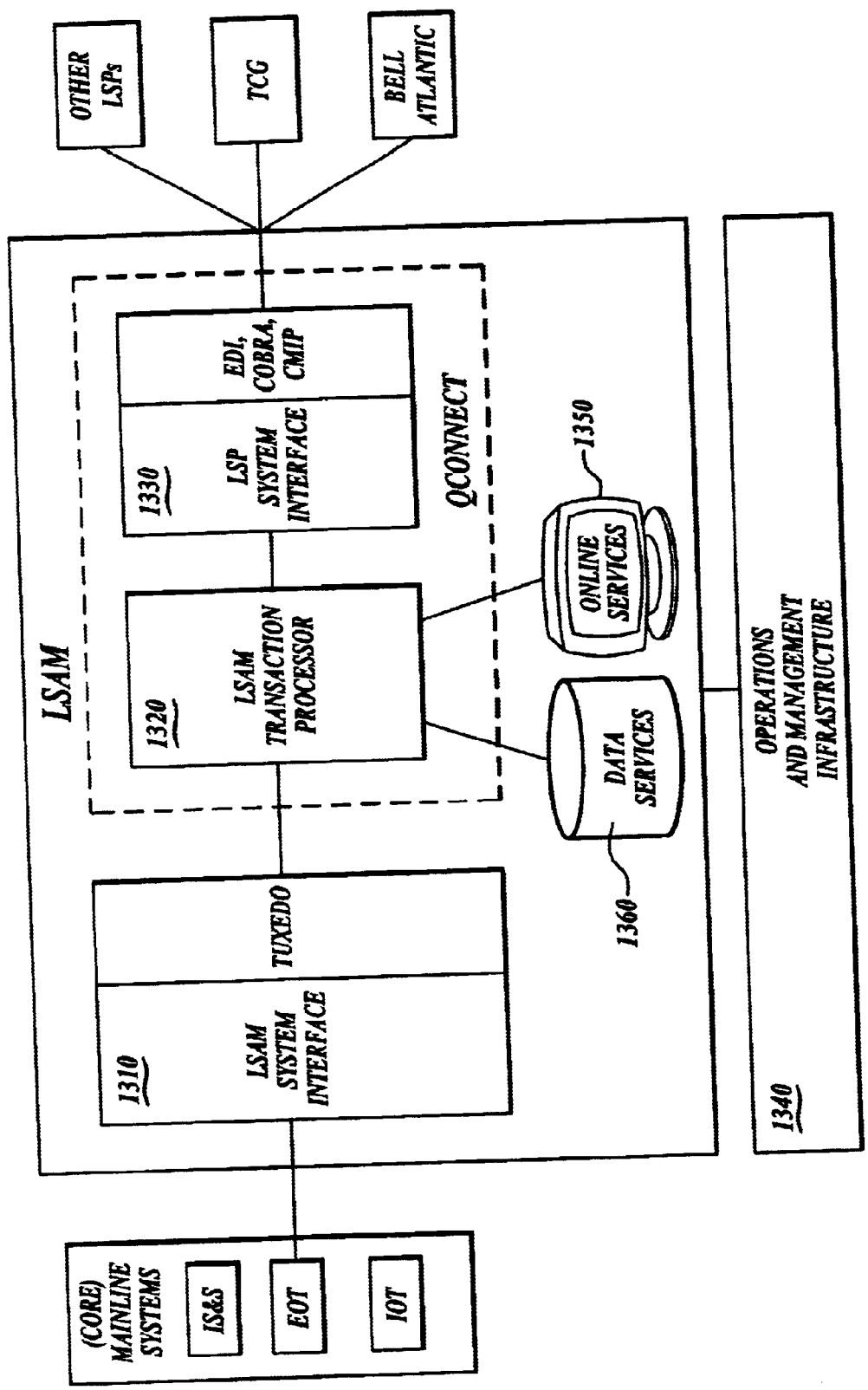
FIG. 13 is an illustration of the six major technical components of the LSAM Technical Architecture.
Figure 14:
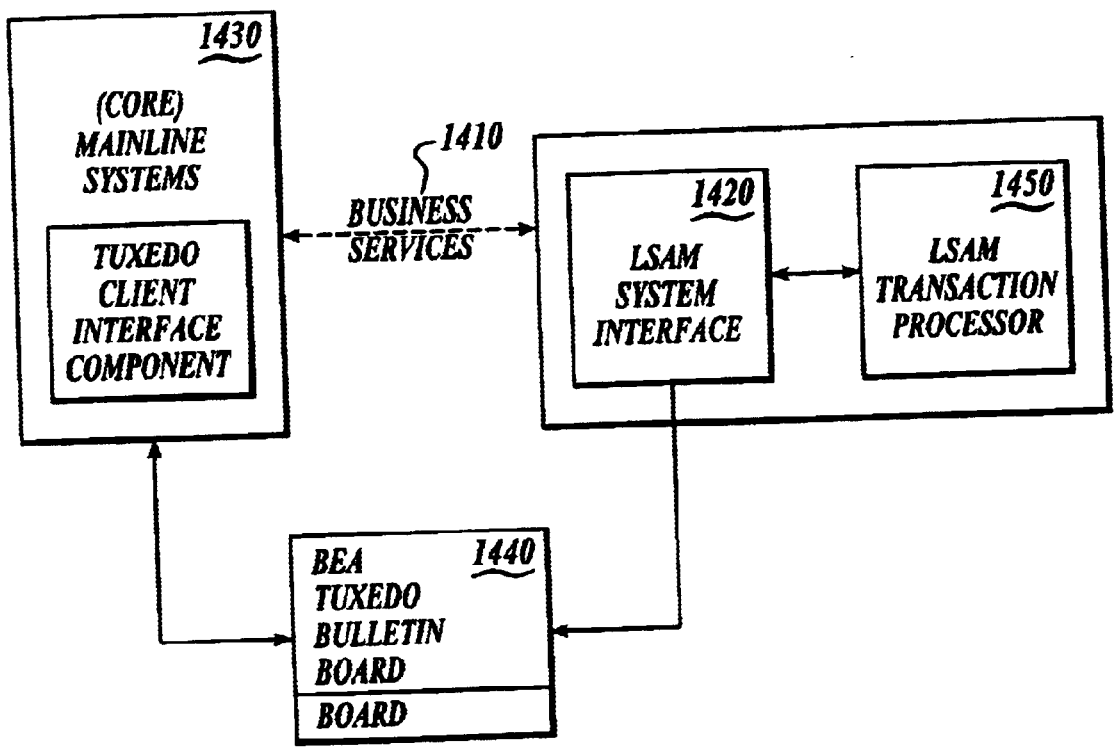
FIG. 14 is an illustration of an exemplary interface system between a core system and the transaction processor.

As shown in FIG. 13, the LSAM technical architecture includes components such as a LSAM system interface 1310, a transaction processor 1320, an LSP system interface 1330, an operations and management infrastructure 1340, on-line services 1350, and data services 1360. Each of these components is integrated into layered technical platform local ordering, pre-ordering and trouble business functions LSAM System Interface The LSAM system interface 1420 provides the point of integration between LSAM and all NSP core systems. As shown in FIG. 14, the interface 1410 consists of a set of business services, such as Tuxedo business services 1440, that expose LSAM's functionality and processing capabilities. Business services pass messages from core systems 1430 to LSAM's transaction processor 1450 where business logic is performed. The use of Tuxedo within the LSAM system interface enables both scalability and reliability. These capabilities are provided through Tuxedo's feature including transaction management, multithreading, priority scheduling, load balancing, fail-over and guaranteed message delivery, physical data translation (e.g., ASCII to EBCDIC), resource management, and transaction partitioning.

As a result, of these features, it is recommended that LSAM be deployed and partitioned over different physical servers to provide scalability, load-balancing and fail-overs.

Figure 15:
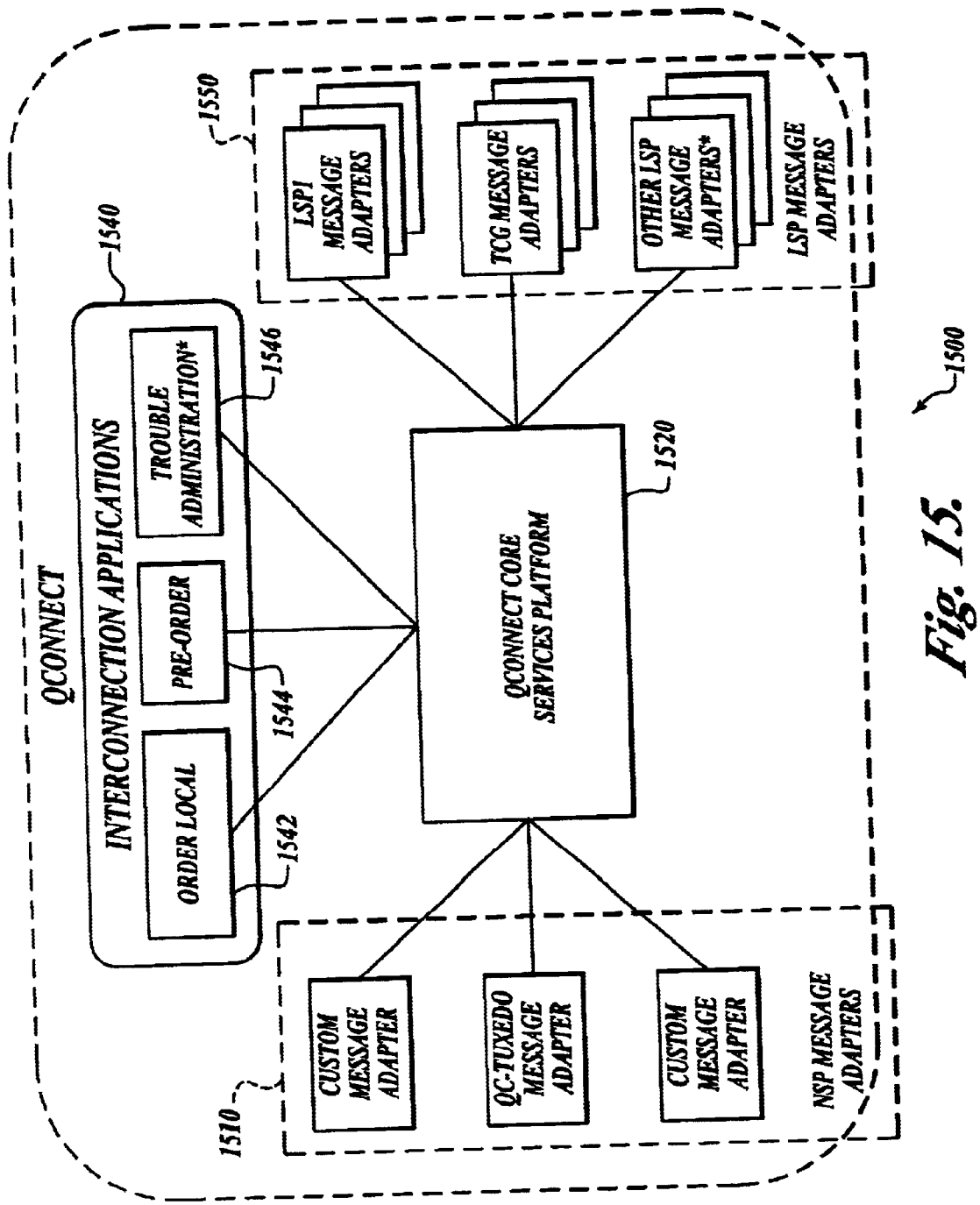
FIG. 15 depicts how QConnect is used to implement components of the present invention.

The LSAM transaction processor and LSP systems interfaces can be built using third-party software such as Quintessent's QConnect. FIG. 15 illustrates one embodiment of how QConnect is used to implement LSAM components 1500.

In this embodiment the NSP message adapters 1510 interface the rest of QConnect to the LSAM system interface. A standard message adapter 1530, such as a QC-Tuxedo message adapter, is configured to receive, authenticate, translate, and validate messages from NSP mainline systems. It can be built using a QConnect message adapter framework. It is multi-threaded, allowing for high performance, bi-directional transfer with NSP's systems. The configuration of the translation and validations is done via third-party software such as QConnect Studio. It's primary function is to translate between the NSP specific information formats and the abstracted information format utilized within QConnect.

In one embodiment, interconnect applications 1540 handle the process flow, both nominal and exceptional, for business transactions. They operate solely on data that has been translated into an abstracted format by message adapters. This insulates business processes from differences in interface and protocol specifications. Interconnection applications 1540 provide a configurable business process model representing the sequence of business events that make up given business transaction. QConnect Studio is used to modify the business process definitions to reflect the NSP's specific requirements for services including Pre-Order 1542, Order 1544 and Trouble Services 1546. Business rules for determining how to provision particular service requests, for example, UNE-L and UNE-P, are represented directly as a series of conditional branches. All request, response, failure, and exception processing is managed by the QConnect interconnection applications. QConnect Interconnection Applications have access to a wide variety of services such as table lookups, message construction, and callout to external services and data sources.

A core services platform 1520 provides common software and communication services used by the interconnection applications 1540 and message adapters 1510, 1550. These services include a service locator which processes location transparency, and a system manager for configuration, performance, accounting, alarming, tracing, and process control. Also a security system providing system and component security, access control, authorization, and digital signatures; a message builder for configuration of object-driven external-to-internal message format translator; and a message object queue for intercomponent message queues and guaranteed message delivery. In addition, the platform includes a work service for business process management, execution, and persistence; logging for transaction, message, and system activity log; and a librarian for configuration and model repositories and process definitions.

An LSP message adapter 1550 may handle the interface with a specific LSP for a specific interconnection application. They are built using the same techniques as the NSP message adapters but implement different translations, validations and protocol interfaces. The LSP message adapters translate between the abstracted third-party software formats such as QConnect formats and the specific formats utilized by the LSP. The information and protocol requirements vary per LSP.

The details of each LSP message adapter 1550 may be found in the joint implementation agreements between the NSP and the LSP. Off-the-shelf message adapters are available for a variety of protocols, including pre-ordering (EDI [TCIF Issue 9], CORBA [ECICJ]); ordering (EDI [TCIF Issue 7+] using Connect:Direct, SMTP [custom]); trouble administration (CMIP [ANSI T1.227/228, ECIC]); and others (ASCII/TLV, mechanized specification, HTTP/HTML, terminals).

More specialized adapters for major carriers are also available. These implement the publicly known differences to industry recommendations required by the major carrier. Because they come as off-the-shelf software, the time and cost to implement interfaces to major carriers is further reduced. QConnect Message Adapters are customized using QConnect Studio. The validation and translation specifications can be simply and rapidly customized to meet the NSP's specific requirements above and beyond that supplied in the standard QConnect Message Adapters.

The operations and management infrastructure integrates LSAM with the NSP's overall operations environment. The infrastructure may provide system wide services for security, logging, data archival, backup & restore functions, system scheduling, and reporting.

LSAM security services may integrate with the NSP's network and data security environment. These services can include NSP corporate standards for encryption, authentication, data access and user access control. All of the LSAM technical architecture components can utilize a common set of message logging services. These services should be fully configurable as to the type of messages (application, architecture, security, performance, debug), the level of logging (total, warning, international) and the location of messages (flat file, database). Logged messages may also form the basis for LSAM system reporting and event management. Data Archival services allow for completed transactions to be reviewed from the LSAM's on-line databases and permanently stored off-line. This helps to minimize the size of LSAM's transaction databases while providing a complete historical audit trail.

Scheduling services provide complete and flexible scheduling of LSAM's system level processes. These processes schedule database backups, system start-up and shutdown, batch program execution and report generation. Scheduling should be coordinated and managed across LSAM's physical configuration. In addition, scheduling services may be supported by both time and event dependencies.

Reporting servers work with exported "log" data. It uses data exported into the relational database to analyze and create various predefined and ad hoc reports. Some examples could include summaries of total transaction exceptions, hourly volumes, and average time to complete by LSP by product type.

The LSAM data services may maintain local data by business applications. In one embodiment, an example of local data includes cached pie-order data, work orders and connectivity data. Third-party software such as Oracle may be used to manage all local data. Access to Oracle data can be done through routine Oracle interfaces for high performance. In addition, Oracle's parallel server capabilities can be used to provide for high-availability of critical data.

Finally, data servers may provide for complete support of database backup, recovery and other database administrator activities.

While LSAM is predominantly a server application with minimal direct user interface, there may be a need for some online utility applications to support processing. In one embodiment, for example, the LSAM fallout manager provides application managers with a convenient tool to view and make minor modifications to the status of transactions.

Online services provide the framework for developing these online utilities. Specifically, online services should support the development of either thin-client or browser-based front ends. The exact implementation of these services should conform to the NSP architecture framework.

Figure 16:
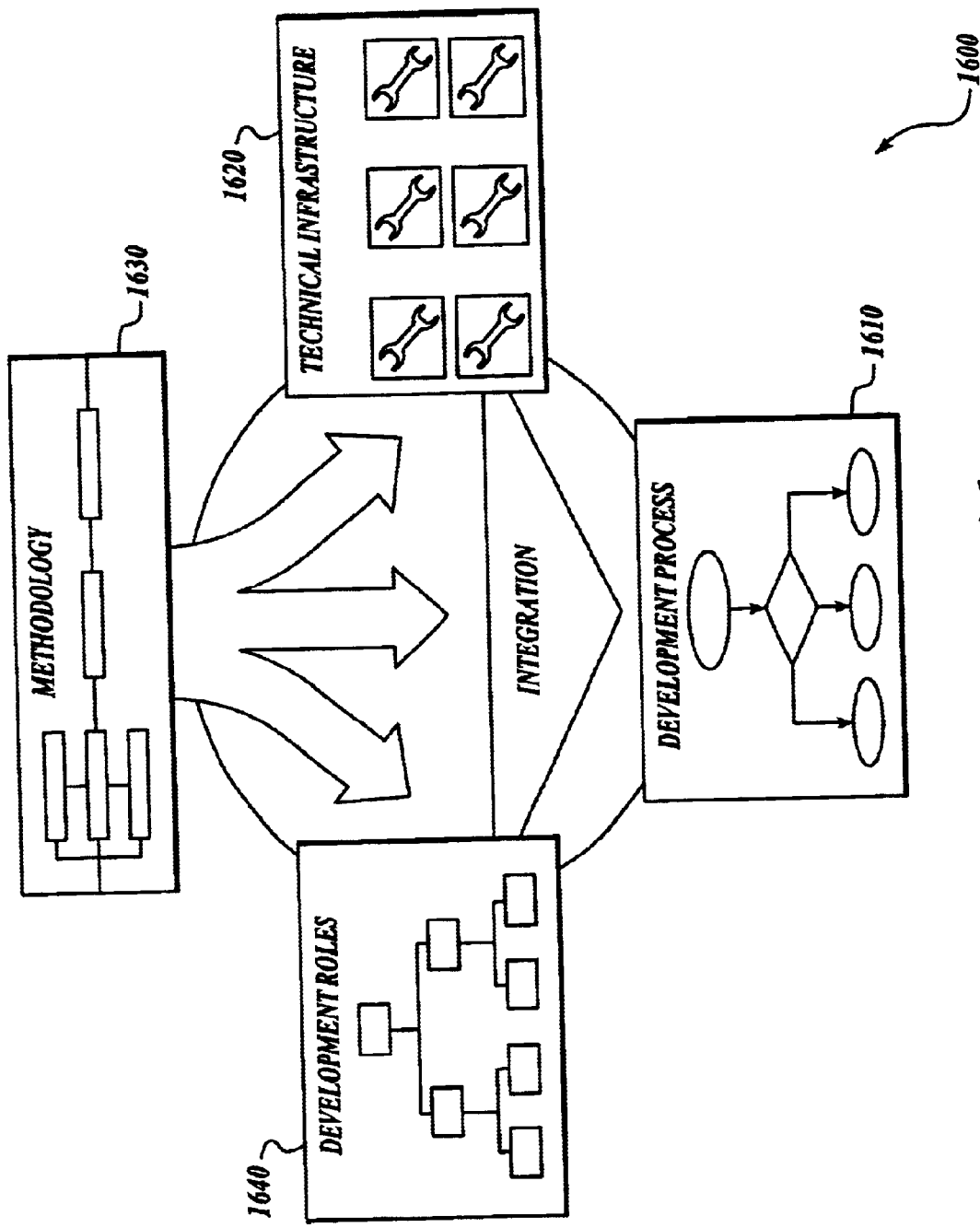
FIG. 16 illustrates a development architecture for constructing the present invention.

Development architecture should be tailored to meet the NSP's specific requirements for constructing LSAM for a particular NSP. As shown in FIG. 16, this development architecture 1600 may incorporate a complete business integration methodology 1630 encompassing planning, delivery, managing and operating complex systems. In addition the architecture may include a CMM Level-3 certified software development process 1610, a technical infrastructure 1620 consisting of all the construction tools necessary to create, test, and control the development of LSAM, and a highly skilled development team of functional and technical experts 1640, already trained to use common development procedures.

Figure 17:
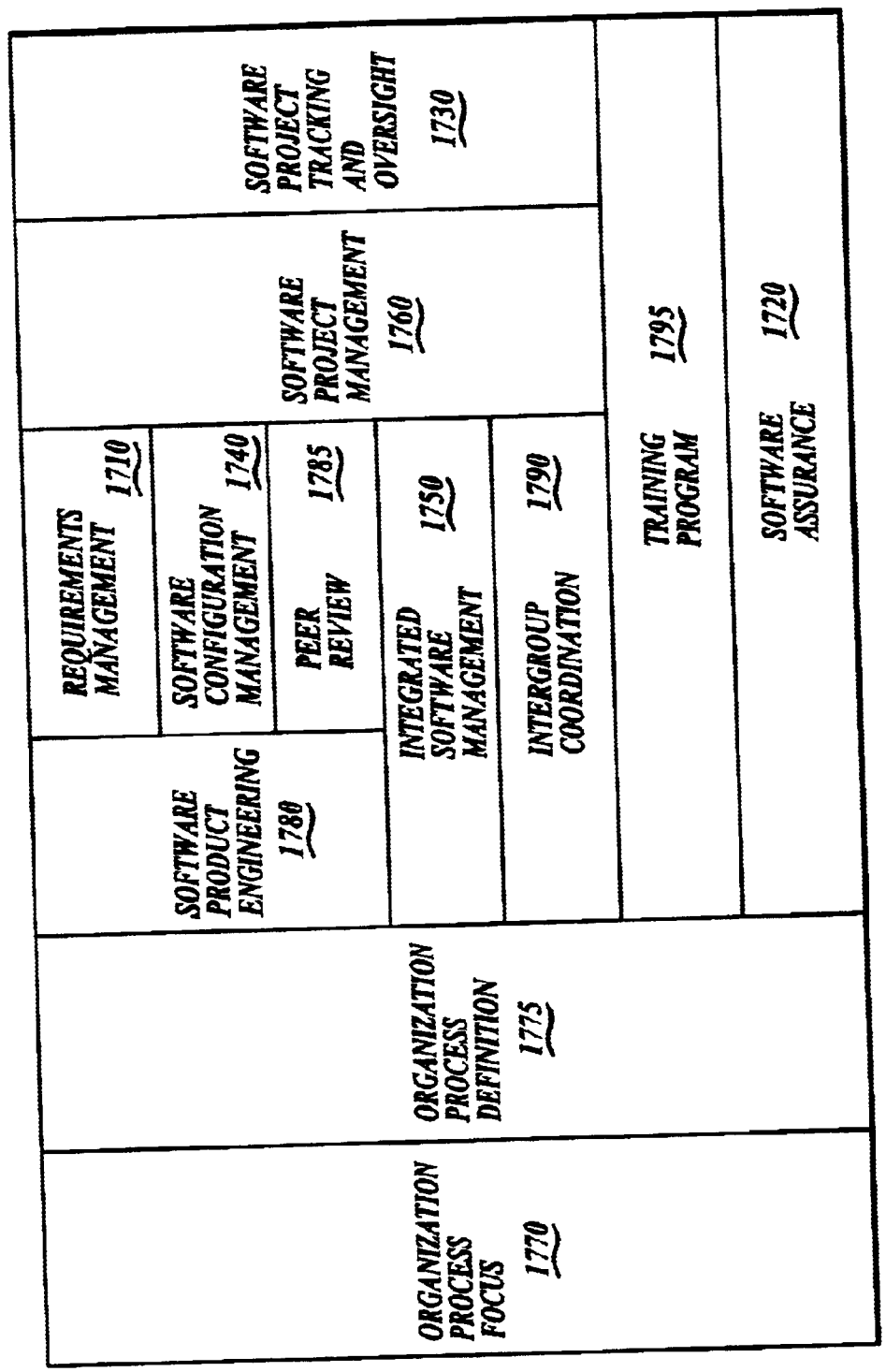
FIG. 17 illustrates an exemplary software development process in accordance with one embodiment of the present invention.

A software development process should be capable of maintaining a level of quality such as being Level-3 capability maturity model (CMM) compliant. This process 1700 includes the strategies illustrated in FIG. 17 and described below.

Requirements Management 1710 is a process where an agreement with the NSP is established and maintained on the requirements for the project and controlling changes to those requirements. This process is executed at the conceptual design phase. The requirements can be documented in the conceptual design deliverables and required for the NSP to sign-off before proceeding to the next development task.

A Software Quality Assurance (SQA) 1720 objective is to provide timely verification and/or suggestions for improvements for both the project's product and the related software development process. The SQA process involves project members of all levels at various points throughout the project lifecycle.

Software Project Tracking 1730 for an LSAM project provides tracking and reviewing of the software accomplishments and results against documented estimates, commitments and plans, and adjusting these plans based on actual accomplishments and results. Regular (e.g., weekly) project management meeting can be conducted for this purpose. Regular steering committee meeting can be conducted to supplement this purpose.

Software Configuration Management (CM) 1740 includes key areas of software management such as backup and recovery, system/user security, component migrations, source code control, change control, system/event monitoring, desktop configuration, project plan management 1760, and software development process repositories.

Integrated Software Management 1750 of the LSAM project should work with NSP information technology (IT) to tailor the process and management activities into a coherent, defined software process that is fits into NSP's standard software process and related process assets. The LSAM project can be planned and managed to the tailored process.

Other function such as organization process focus 1770, Organization process definition 1775, software product engineering 1780, peer reviews 1785, intergroup coordination 1790 and training programs 1795 are also incorporated.

LSAM's technical infrastructure consists of a complete set of tools for the construction, testing, and management of the LSAM system. One embodiment illustrates a sample of some of the management tools in the technical infrastructure in such categories as design, project management, programming, office automation, software configuration management, development hardware, and testing. The specifics of this list can be tailored to meet the exact needs of the LSAM project while supporting the NSP architectural framework.

Third-party software may be used to implement the infrastructure. Successful implementation of LSAM requires a skilled team of both functional and technical experts, already trained to use common development processes. This skilled team can quickly "come up to speed" using common tools to efficiently implement LSAM.

In addition, the development team should be made up of a number specific roles fulfilled by team members. These roles will ensure that proper time and attention is given to issues of critical project importance. Some of these roles include a project manager who has overall responsibility and accountability to the steering committee for solution delivery. Team management and resource coordination are key responsibilities. The technical architect who ensures that the technical requirements are supported by the technical architecture and application modules. An application architect who ensures that the application meets the client's critical requirements and that each of the application's components is designed and built correctly. The development manager who ensures that the functional requirements are defined and supported by the application modules. A client site director who focuses on the development activities that take place primarily at the NSP's site. A project's other architects focus on process, functional, change, testing, and conversion activities.

Operations Architecture

Figure 18:
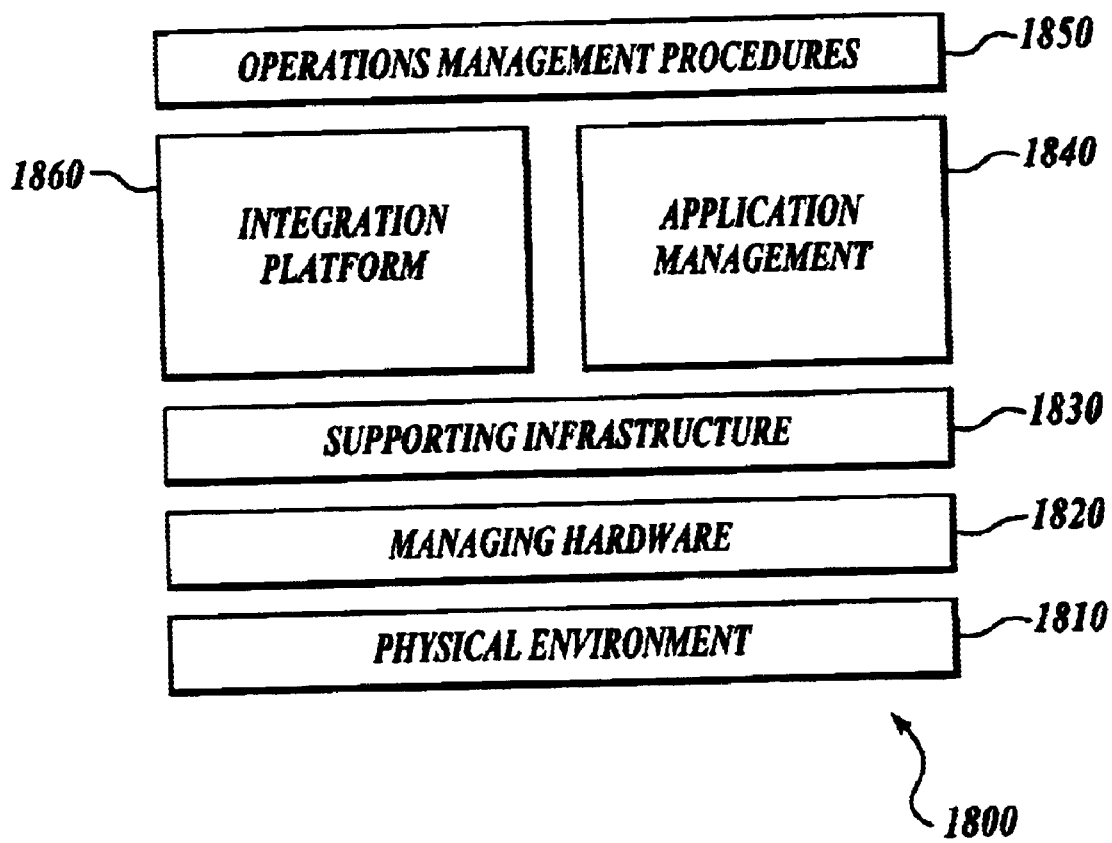
FIG. 18 illustrates an operations architecture in accordance with one embodiment of the present invention.

The LSAM operations architecture must support business processing requirements such as fault and event monitoring, performance management and configuration management. FIG. 18 depicts the solution that meets these essential requirements 1800.

Physical Environment 1810 includes all the support indirectly involved in maintaining and managing the physical distributed environment (e.g., printer, server, uninterrupted power supplies (UPS), LAN, facilities, etc.). The LSAM solution should be deployed into an existing NSP's data center that has the entire necessary physical environment in place to support LSAM. It is assumed that the NSP's existing physical environment management procedures are in-placed.

Managing Hardware 1820 is all the hardware directly used to manage the environment. This includes all staging components. These components are devoted to systems management functions. Examples of managing hardware include management servers, management controllers, management consoles, probes, and sniffers. Tools and procedures to manage the hardware should be based on existing NSP's environment and infrastructure.

Supporting Infrastructure 1830 is the subset of operating systems, utilities, languages, and protocols used to support the management of the LSAM system. (See FIG. 19) The supporting infrastructure 1830 is most often determined by the execution and development environments and the business applications on the system. It is necessary to ensure that the other components of the operational architecture are compatible with the existing supporting infrastructure 1830. The toolset solutions may include Sun Solaris, Oracle, Quintessent QConnect, Tuxedo, and TCP/IP. The collection of these administration toolsets allow operations staff to administer the LSAM system. Besides using the utility provided by the operating system, on-line transaction processor (OLTP) monitor, database management system (DBMS), and LSAM. Other tools include a startup/shutdown automated tool for gracefully starting and stopping application and system software (e.g., Database, Tuxedo) elements; and a recovery tool which facilitates the recovery to normal processing mode after a failure has occurred. When a failure occurs, LSAM will fail-over to degraded mode. The recovery back to normal mode will be assisted by recovery tools.

Integration Platform 1860 provides a common platform for the operational architecture. At the lowest level this means deciding on common standards, interfaces, message formats, and file logging forms to be used with all the management tools. Third-party integration platforms may be used, such as IBM NetView, HP OpenView, SunNet Manager, Spectrum, CA-Unicenter, and Tivoli Management Environment. It is assumed that the NSP may use one or a combination of these tools.

Figure 19:
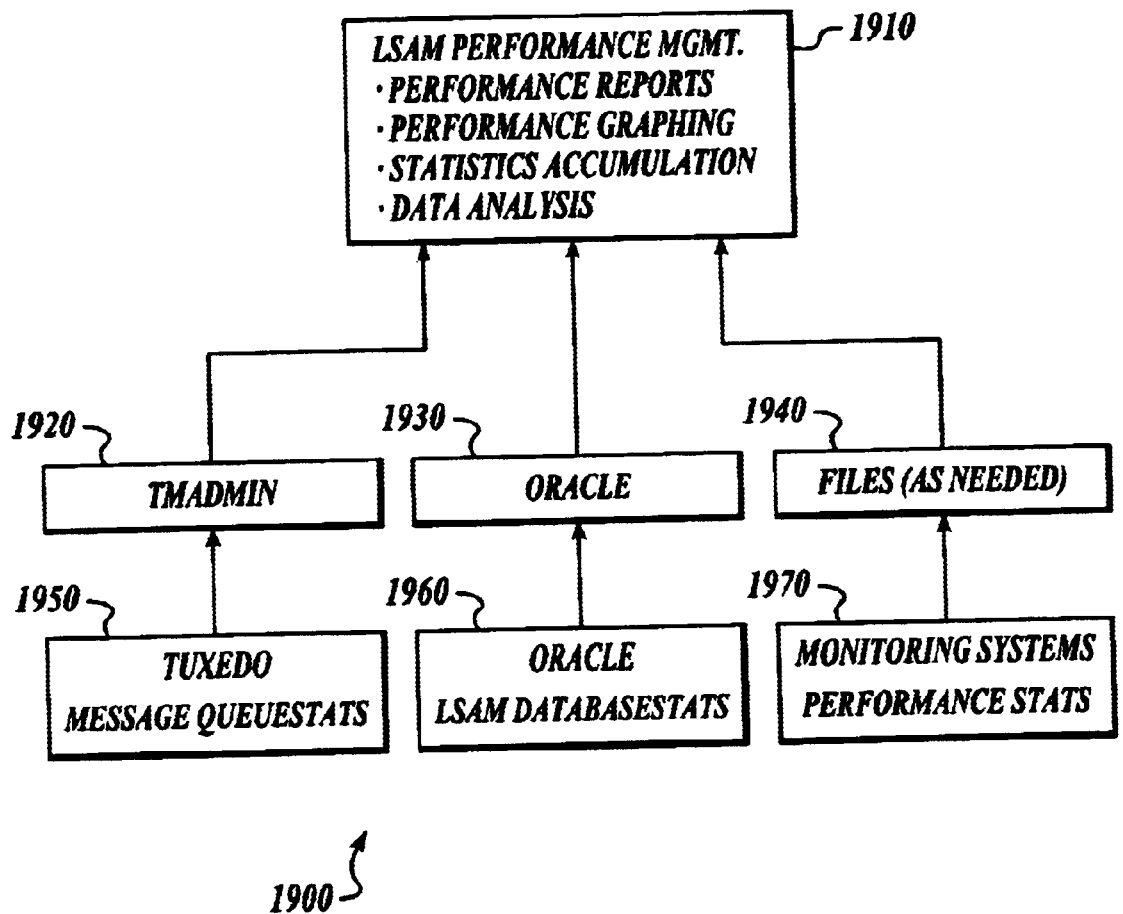
FIG. 19 illustrates a supporting infrastructure in accordance with one embodiment of the present invention.

FIG. 19. Illustrates the supporting infrastructure in accordance with one embodiment 1900 of the present invention. Recommendations included for choosing a LSAM performance management 1910 platform include identifying performance metrics, collecting, and generating application statistics reports. This is accomplished by gathering data from applications such as Tuxedo message queue statistics 1950 via an interface such as TMADMIN 1920, Oracle LSAM database statistics 1960 via an Oracle interface 1930, and monitoring system performance statistics 1970 collected and store in specific files 1940.

In addition, relying on SNMP (Simple Network Management Protocol) based management platform for collection of data for the servers. The hardware vendor provides these and it forms part of the hardware and software installation. These agents send SNMP data to the NSP's existing system monitoring. LSAM logs all error events into a log-file that are required by these agents to raise alerts/events. The logging of LSAM errors were described in the execution architecture detailed description section. Finally, the platform should utilize the comprehensive reporting tools that are provided with the integration platform.

Figure 20:
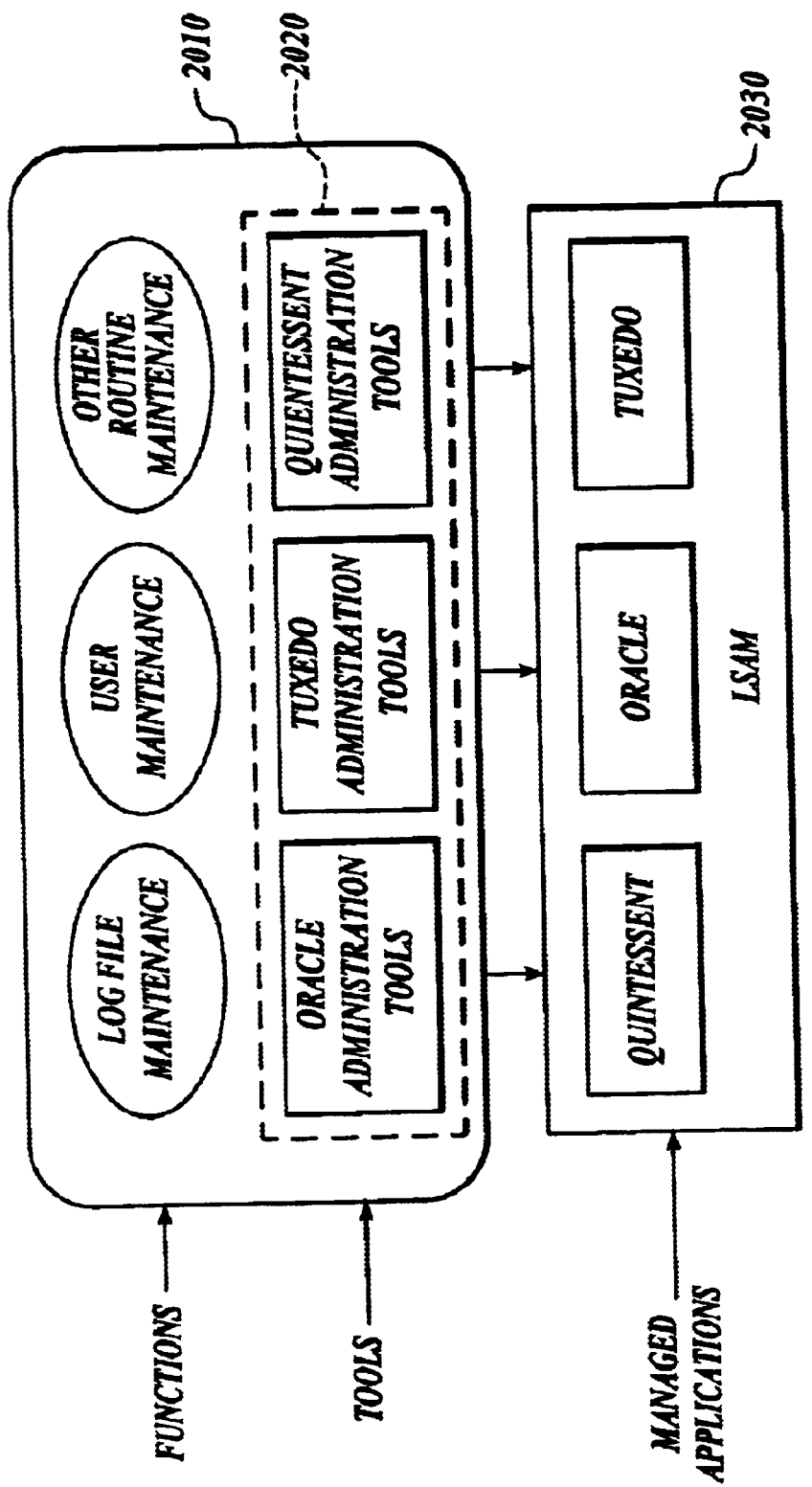
FIG. 20 illustrates various tools used to perform various functions in the system of the present invention.

Application Management 1840 includes those tools which are used to manage the LSAM system. It also includes user access security profile maintenance. FIG. 20 illustrates one embodiment for the tools used to perform various functions in the LSAM system. A plurality of functions 2010 utilize tools 2020 which are eventually managed by specific applications 2030.

In one embodiment these tools may include a configuration tool 2020 such as Quintessent QConnect which provides tools for LSAM static data, business rules, and standards data maintenance; an application security access profile maintenance tool provided for security and access to the LSAM; and a DBMS and Tuxedo maintenance tool which may be provided by the vendor to provide administration 2030 of LSAM.

An auditing reporting tool for auditing capabilities can be integrated into the application architecture. This auditing and reporting facility permits application administrators to track user activities within the LSAM application.

To manage and operate the LSAM effectively, a set of procedures 1850 must be defined. A documented approach to LSAM disaster recovery (DR) will be provided. Included in the document should be the anticipated organizational structure supporting DR as well as a test plan for executing formal DR tests, as follows.

A scheduled maintenance document which provides procedures for directing the organizations and methods for carrying out scheduled maintenance on the production system.

Figure 21:
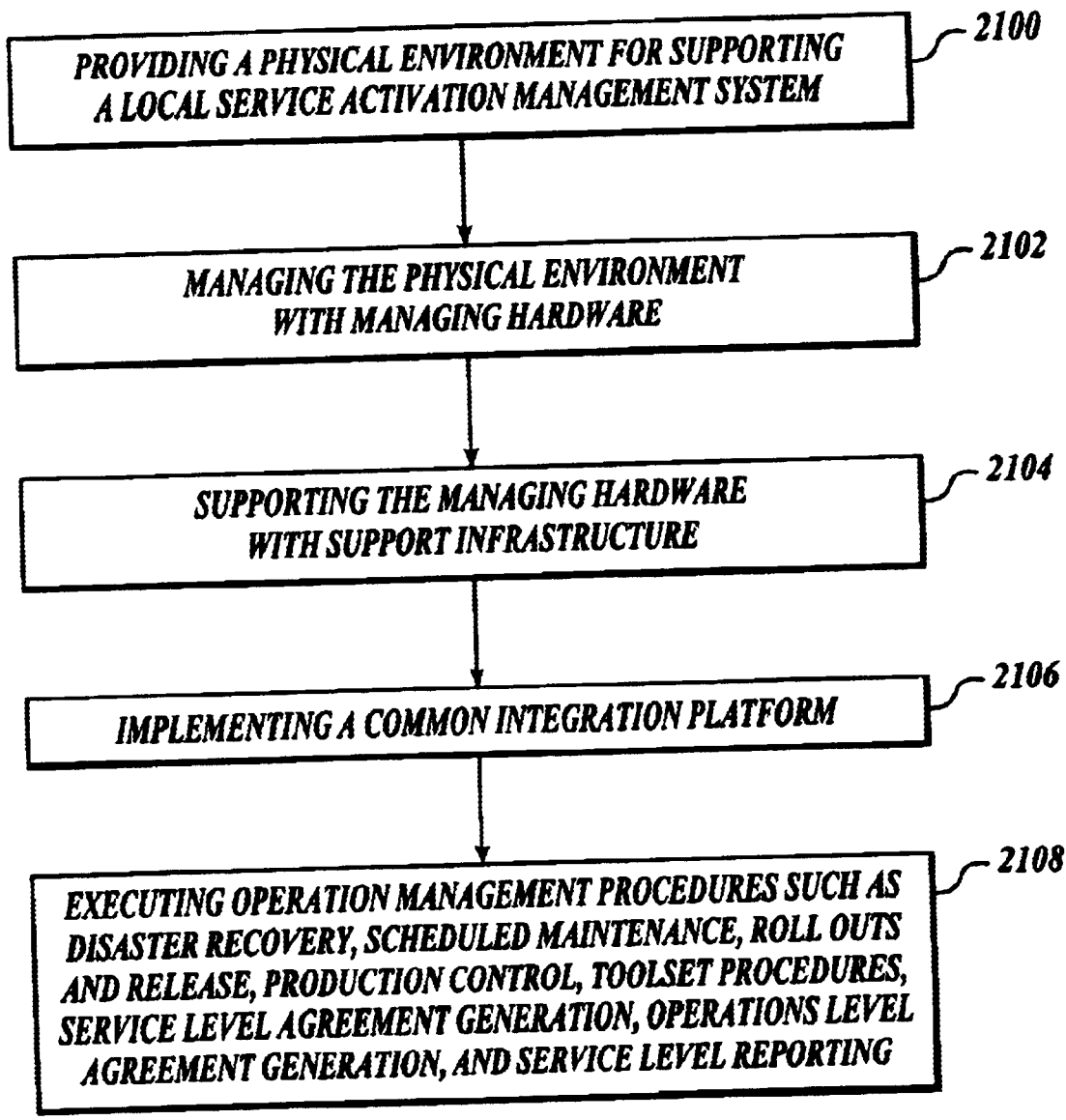
FIG. 21 is a flowchart illustrating summary of a method for providing an operations architecture to implement a local service activation management system, as indicated in FIGS. 18–20.

FIG. 21 illustrates a summary of the steps involved for providing an operations architecture to implement a local service activation management system, as set forth hereinabove in reference to FIGS. 18–14 20. In operation 2100, a physical environment is provided for supporting a local service activation management system. The physical environment is managed in operation 2102 with managing hardware. The managing hardware is supported with support infrastructure in operation 2104. A common integration platform is implemented in operation 2106. In operation 2108, operation management procedures are executed. The operation management procedures are selected from the group of operation management procedures consisting of disaster recovery, scheduled maintenance, roll outs and release, production control, toolset procedures, service level agreement generation, operations level agreement generation, and service level reporting.

Additional Services

In addition to the services already described, additional categories of support may be considered at some point after implementation of LSAM to further increase the program's success. These services include an LSAM wrapper development which is the concurrent system design, development and testing of a custom application to manage functional and technical integration of the LSAM platform with NSP core components if standard interfaces are not used.

A software maintenance "development factory" supports ongoing NSP-specific functional modifications to LSAM and to the LSAM wrapper. An LSAM rollout support activity enables LSAM business implementation and operations. A business process design supports design and development of local service order related business processes and operations consistent with LSAM design. A program manager is the alignment and rigorous management of all projects and activities necessary to successfully launch local service activation business operations. Finally, a subsequent market entry enhancement supports development and implementation of future releases/configurations of LSAM to support subsequent market entry and new business capabilities.

Advantages of Additional Services

The table below outlines various additional areas of support that would benefit the NSP.

| Additional Proposal | Benefits over Baseline Proposal |
| --- | --- |
| LSAM Wrapper Development | Help minimize impacts of future core functional modification on LSAM application. |
| | Help reduce service introduction dependency on development activities that would otherwise be the responsibility of NSP resources and teams. |
| | Leverage productivity of software factory operations on multiple concurrent development efforts. |
| Software Maintenance | Leverage productivity of software factory operations on ongoing maintenance efforts. |
| LSAM Rollout Support | Help ensure effective launch and "take up" of new procedures, roles and jobs in local order management. |
| Business Process Design Support | Help confirm mapping of local service activation process steps and systems. |
| | Identify "overlooked" components of the end to end solution. |
| | Identify scenarios that may be leveraged by IST. |
| Program Management | Identify actionable plan for delivery of business expectations. |
| | Help ensure alignment of activities and projects necessary to deliver local service activation and order management business operations. |
| | Help ensure responsibility for delivery is managed |
| Subsequent Market Entry/Enhancement Support | Leverages existing product expertise to expedite LSAM configuration to meet new market business requirements. |

Preferably, the managing hardware includes management servers, management controllers, management consoles, probes, and sniffers. Also preferably, the support infrastructure includes start-up tools, shut-down tolls, and recovery tools. Optionally, the integration platform may include common standards, common interfaces, common message formats, and common file logging forms. Application management tools may also be provided.

Scalability and High Availability Approach

Figure 22:
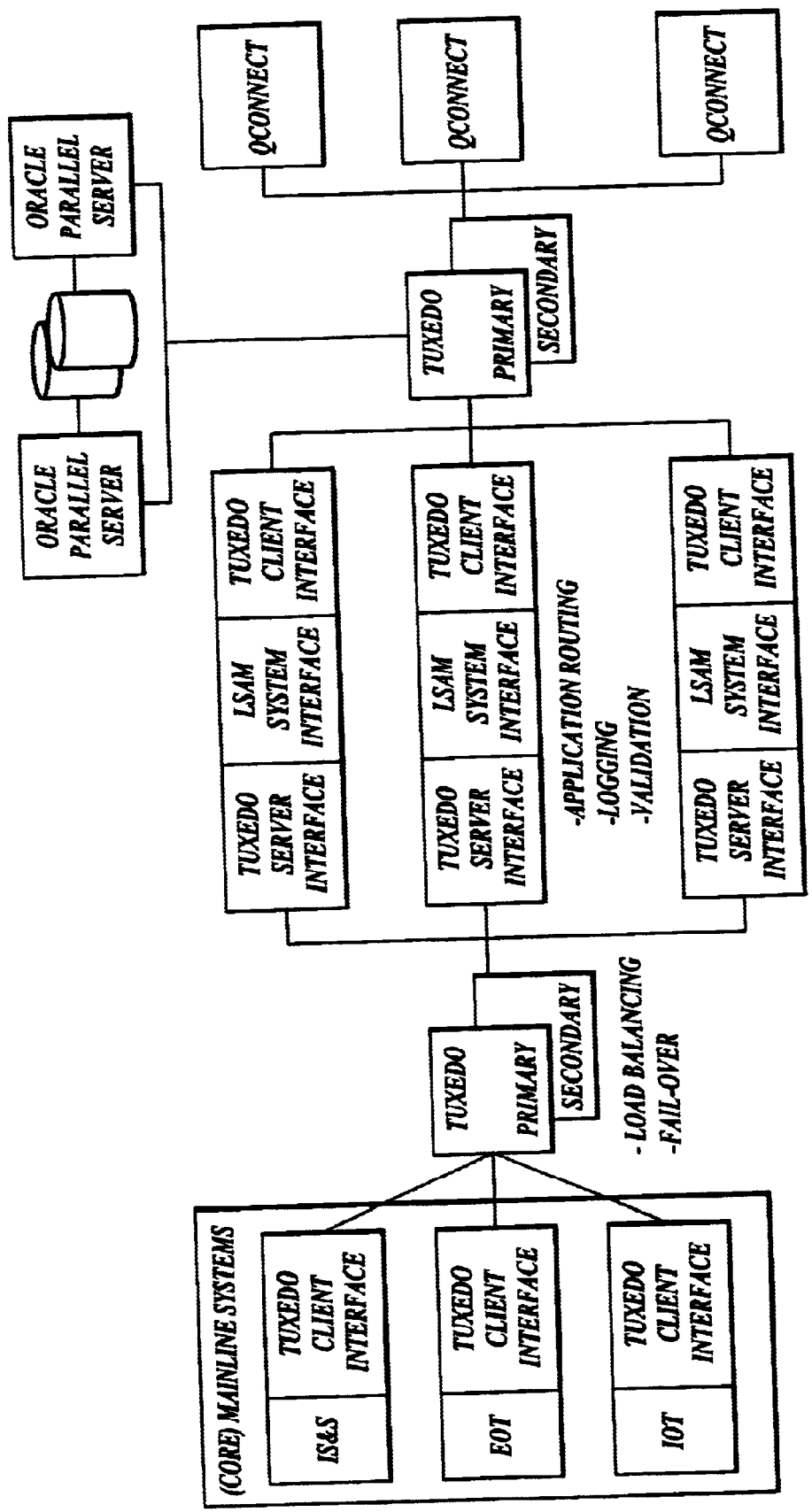
FIG. 22 is an illustration of a scalable and high-availability hardware and software environment in accordance with one embodiment of the present invention.

The hardware, database and application need to work together to achieve scalability and high availability. One embodiment may provide a scalable and high-availability hardware and software environment is shown in FIG. 22.

Figure 23:
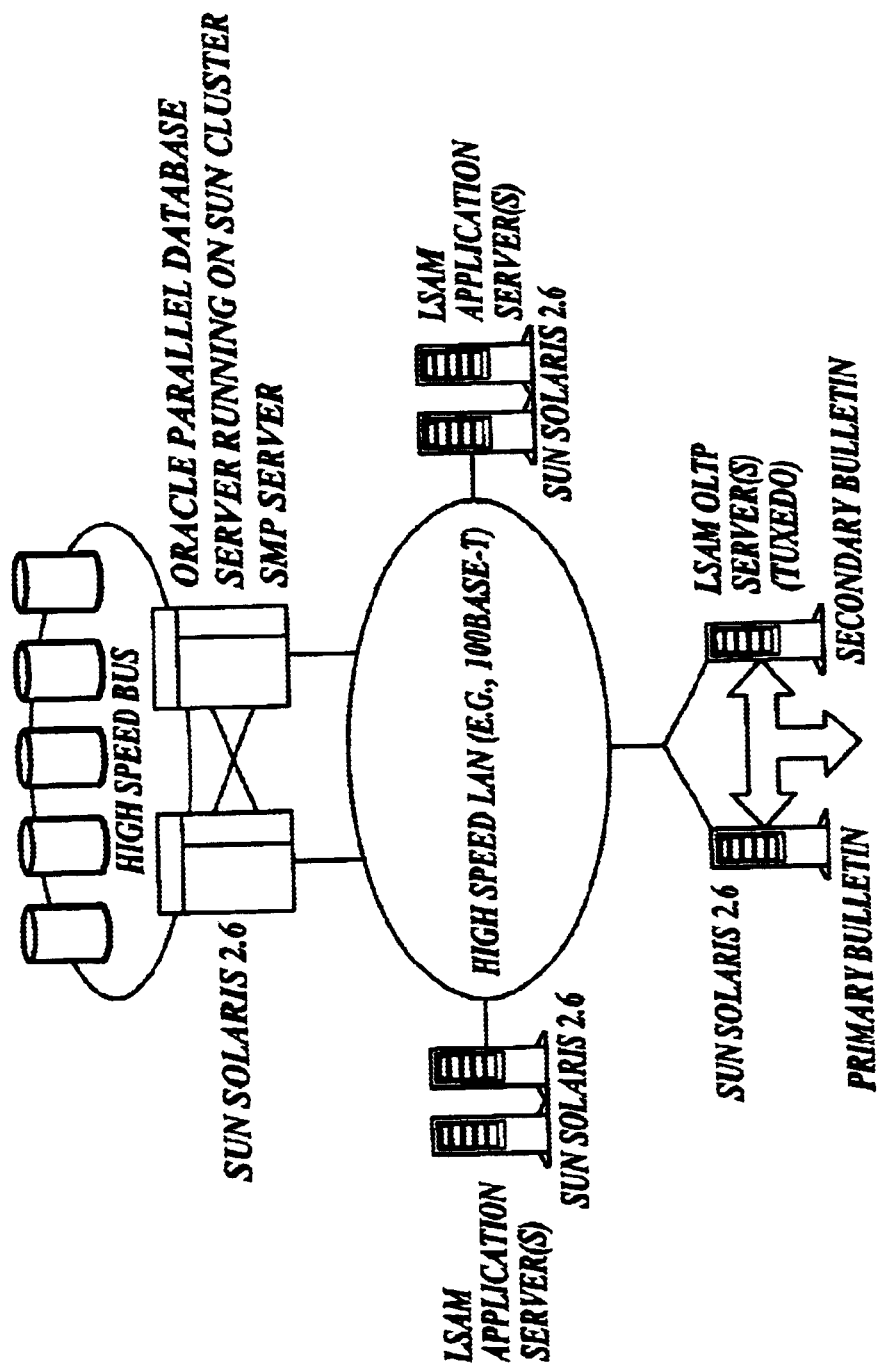
FIG. 23 illustrates an exemplary network designed to reduce failure of the system in accordance with one embodiment of the present invention.

FIG. 23 illustrates an exemplary network designed to reduce failure of the system running LSAM. The following table matches several failure scenarios to exemplary recovery mechanisms.

LSAM Wrapper Development

The "wrapper" application provides custom integration of each core platform component with the LSAM application, thereby isolating the complexity of interface development for each interfacing application. The system interface component of LSAM describes the APIs supported by the LSAM application. These APIs define the specific messages and message layouts that the LSAM application can receive as well as the responses sent from LSAM to the core systems. If the internal core system message standards (technical or functional) are different from the LSAM system interface, the wrapper application converts the core system specific messages to the LSAM system interface standard and vice versa.

In one embodiment, for example, the technical protocol for messaging between LSAM and core systems is designed using a third-party software such as BEA Tuxedo transaction monitor. If the core system cannot or does not interface with Tuxedo, a wrapper application is required for it to interface to the LSAM application. In this case, the wrapper application simply converts the non-Tuxedo messages into a Tuxedo message. Similarly, if the core system messages are implemented using a standard other than the LSAM system interface, a wrapper application may be needed to convert the native message layouts to the LSAM system interface.

It is possible to build the wrapper functionality inside the core systems. However, building the wrapper functionality outside the core system has the advantage of isolating the core systems from LSAM.

A wrapper implementation integrates the messaging layer of a specific core system with the LSAM system. The wrapper application performs one or more translation such as a technical protocol, message format and message content.

In one embodiment, a technical protocol translation occurs when the technical messaging protocol of the core system is incompatible with the LSAM Tuxedo implementation. For example, if the core system messaging protocol is native TCP/IP, the wrapper application may translate TCP/IP message to Tuxedo and vice versa without changing either the format or the content.

A message format translation can occur when the message format of the core system is different from the LSAM message format. This translation does not change the content of the message, only the appearance. Hence this translation assumes a one- to-one correspondence between the message sub-components and data elements.

A message content translation occurs when there is a need to change the message content itself. For example, if the core system requires a different set of error codes to be generated based on the response from the LSAM. This translation is the most difficult and complex of the three translations described here.

LSAM Satellite Network System

The present invention may also be used with a satellite communication network system, and more particularly, to administrate a satellite communication network system providing access to a mobile earth terminal satellite communication device. The mobile earth terminal (MET) 2402 provides voice, data, and facsimile transmission between mobile earth terminals and feederlink earth stations (FESs) 2404 that act as gateways to public networks or base stations associated with private networks, wherein both may networks may be connected to an LSAM.

Figure 24:
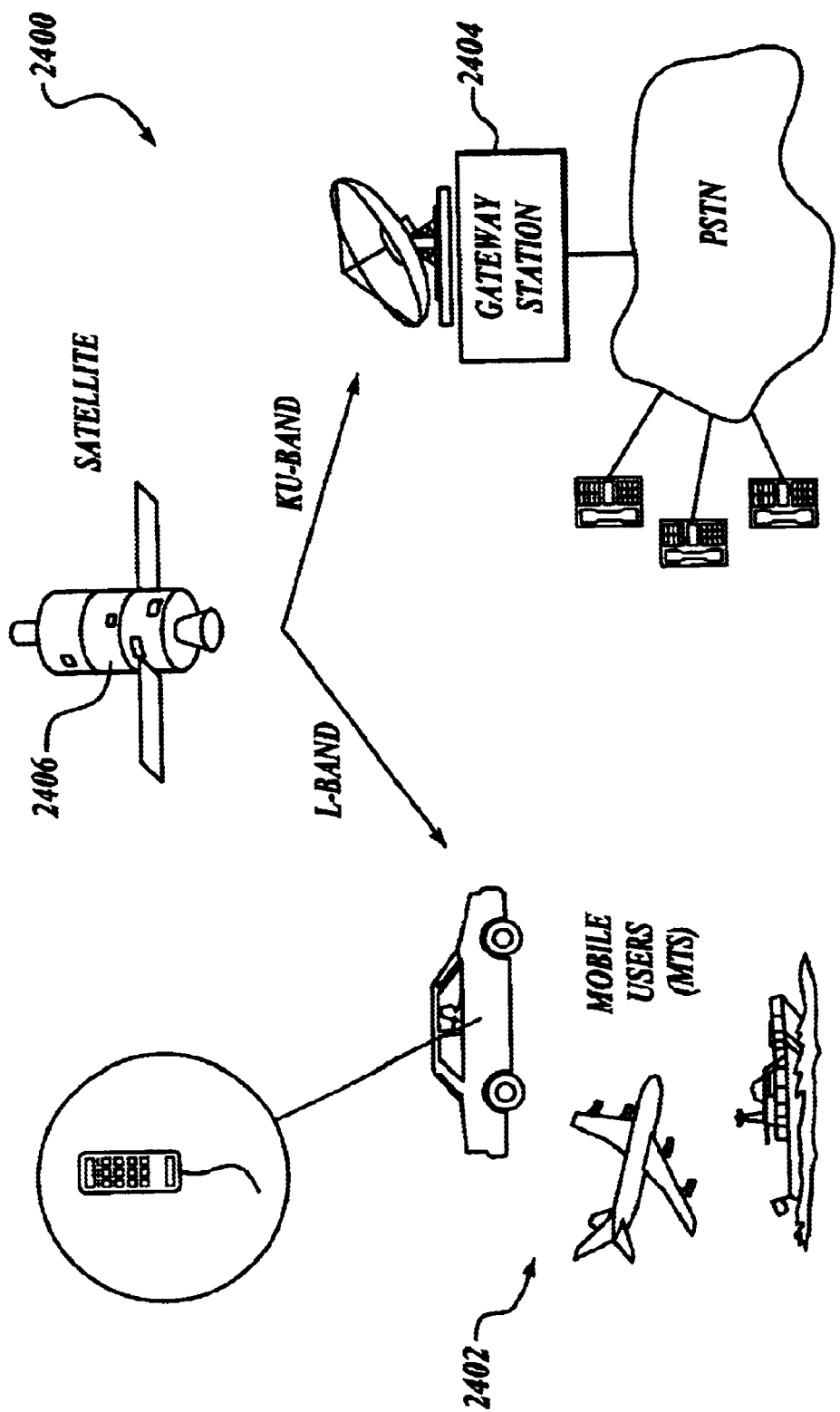
FIG. 24 depicts an overview of a satellite network system in accordance with one embodiment of the present invention.

An overview of the satellite network system is illustrated in FIG. 24. The satellite network system 2400 design provides the capability for METs 2402 and FESs 2404 to access one or more multiple beam satellites 2406 located in geostationary orbit to obtain communications services.

The heart of the satellite network system 2400 for each of the networks is the LSAM which monitors and controls each of the networks. The principal function of the LSAM is to manage the overall satellite network system, to manage access to the satellite network system, to assign satellite circuits to meet the requirements of mobile customers and to provide network management and network administrative and call accounting functions.

The satellites 2406 each transmit and receive signals to and from METs 2402 at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system 2400 provides the capability for mobile earth terminals 2402 to access one or more multiple beam satellites 2406 located in geostationary orbit for the purposes of providing mobile communications services. The satellite network system provides a plurality of general categories of services. A sample of these services is described below.

A Mobile Telephone Service (MTS) provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

A Mobile Radio Service (MRS) provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

A Mobile Telephone Cellular Roaming Service (MTCRS) provides Mobile Telephone Service to mobile subscribers who are also equipped with cellular radio telephones. Then the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

A NET Radio (NR) provides point-to-multipoint circuit switched connections between mobile terminal subscriber stations and a central base station. Mobile users are able to listen to two-way conversations and to transmit using a push-to-talk mode of operation.

A Mobile Data Service (MDS) provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz. Other frequencies may be allocated.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signaling and network management purposes between FESs and NCCs. The aggregate effective isotropic radiated power (AEIRP) is defined as that satellite e.i.r.p. that would result if the total available communications power of the communications subsystem was applied to the beam that covers that part of the service area.

Figure 25:
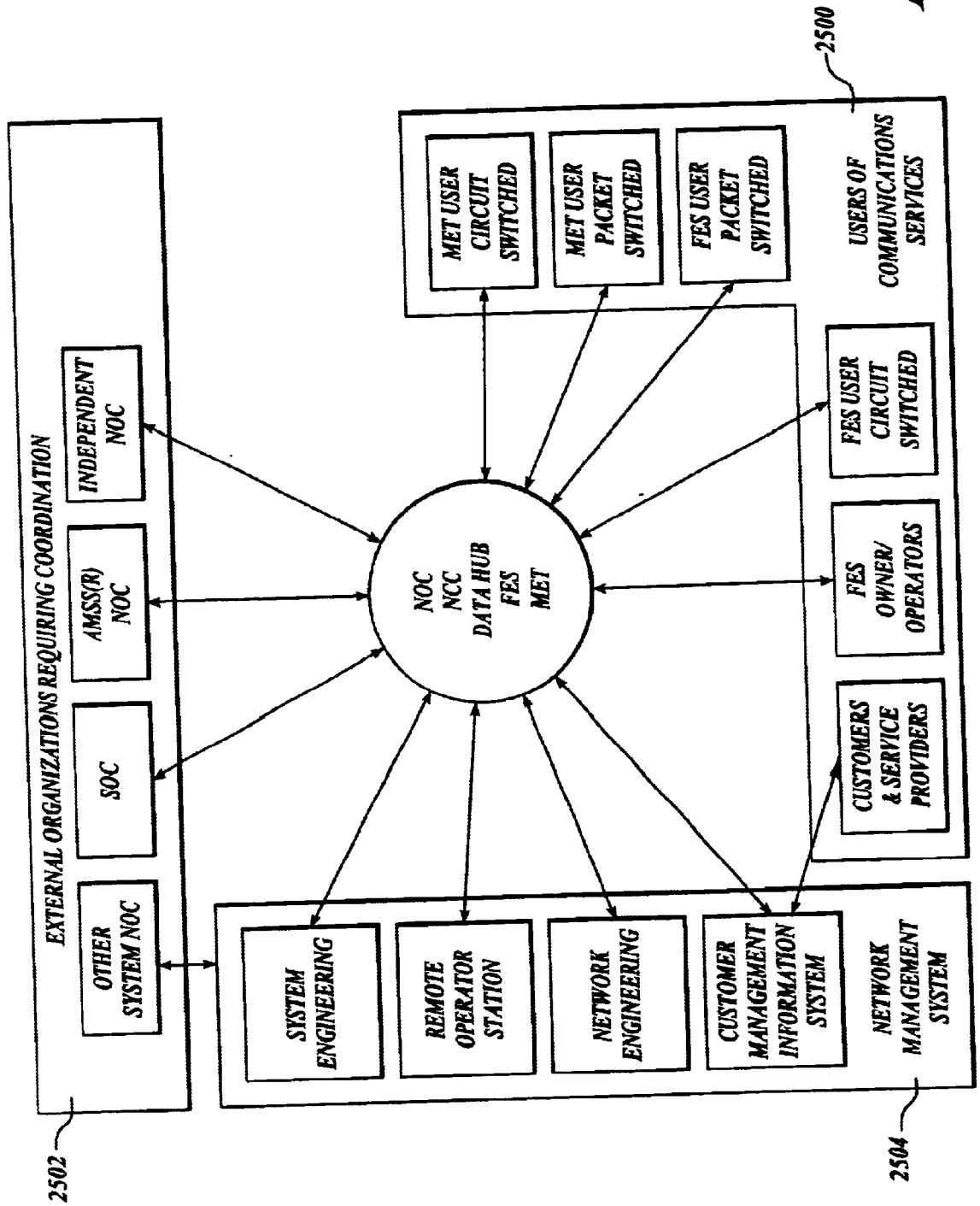
FIG. 25 is a context diagram of the satellite network system illustrating a number of entities which are required to access the satellite network system of FIG. 24 and their respective interfaces.

The satellite network system interfaces to a number of entities which are required to access it for various purposes. FIG. 25 is a context diagram of the satellite network system illustrating these entities and their respective interfaces. Three major classes of entities are defined as user of communications services 2500, external organizations requiring coordination 2502, and network management system 2504.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations such as Satellite Operations Center (SOC) and a Network Operations Center (NOC).

The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

The satellite network system interfaces with the satellites located therein via the NOC for a variety of operational reasons including message delivery and coordination.

Independent NOCs are the satellite network system interfaces with outside organizations which lease resources on satellite network satellites and which are responsible for managing and allocating these resources in a manner suited to their own needs.

Other System NOCs may be external entities representing outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering as described below.

A Customer Management Information System provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

A Network Engineering entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

A System Engineering entity engineers the subsystems, equipment and software which is needed to expand capacity to meet increases in traffic demands and to provide new features and services which become marketable to subscribers.

Figure 26:
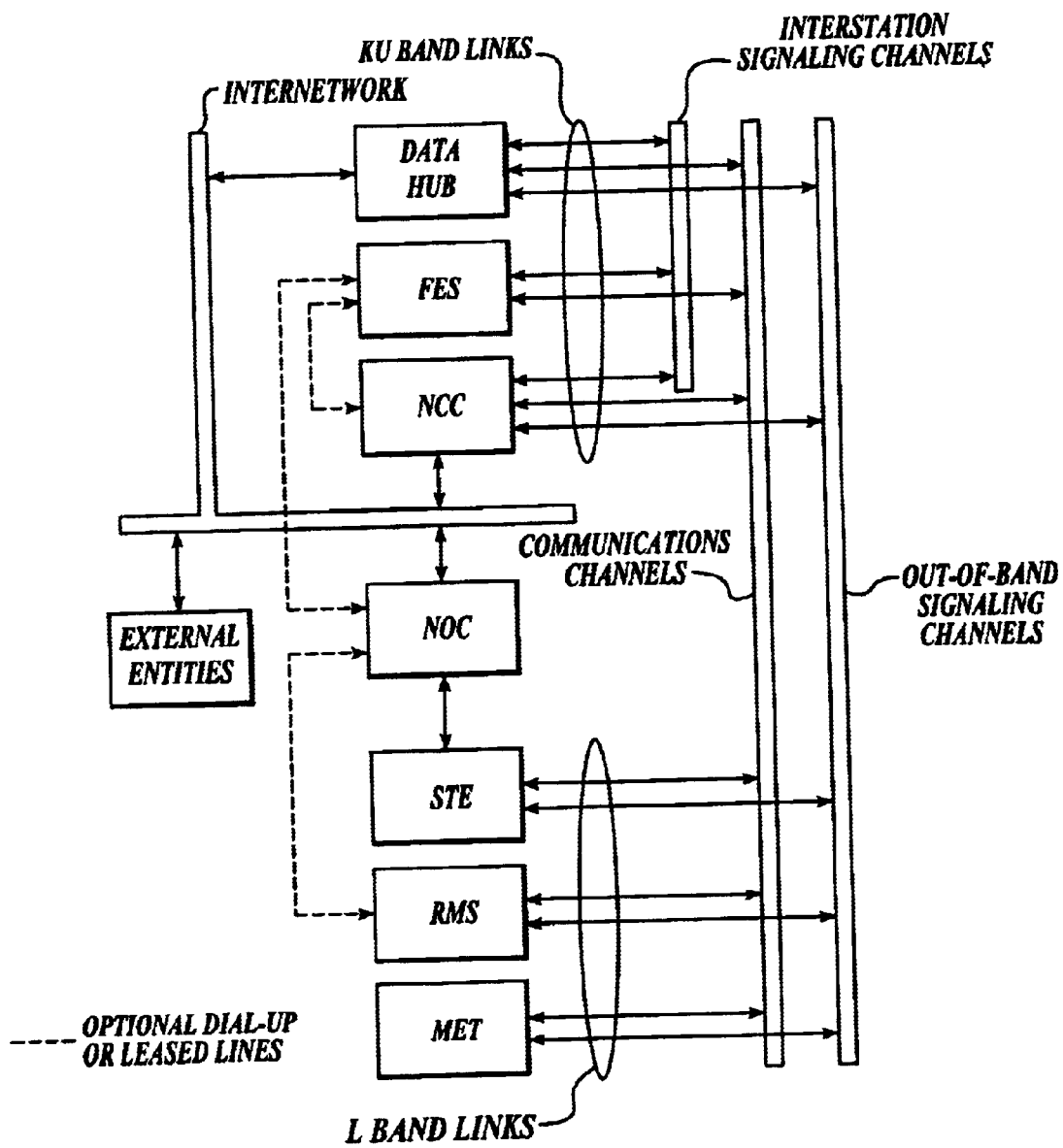
FIG. 26 illustrates a number of system elements of the satellite network system of FIG. 24 and their interconnecting communications links.

The satellite network system comprises a number of system elements and their interconnecting communications links as illustrated in FIG. 26. The system elements are the NOC 2600, the NCC 2602, the FES 2604, the MET 2606, the Remote Monitor Station (RMS) 2608, and the System Test Station (STS). The interconnecting communications links are the satellite network Internetwork, terrestrial links, the MET signaling channels, the Interstation signaling channels, and the MET-FES communications channels. The major functions of each of the system elements are as follows:

The NOC 2600 manages and controls the resources of the satellite network system and carries out the administrative functions associated with the management of the total satellite network system. The NOC 2600 communicates with the various internal and external entities via a local area network (LAN)/wide area network (WAN) based satellite network Internetwork 2601 and dial-up lines.

The NCC 2602 manages the real time allocation of circuits between METs 2606 and FESs 2604 for the purposes of supporting communications. The available circuits are held in circuit pools managed by Group Controllers (GCs) within the NCC 2602.

The NCC 2602 communicates with the NOC 2600 via the satellite network Internetwork 2601, with FESs 2602 via Ku-to-Ku band interstation signaling channels or terrestrial links, and with mobile terminals via Ku-to-L band signaling channels.

The FES 2604 supports communications links between METs 2606, the PSTN, private networks, and other METs 2606. Once a channel is established with a MET 2606, call completion and service feature management is accomplished via In-Band signaling over the communication channel. Two types of FESs 2604 have been defined for the satellite network system; Gateway FESs and Base FESs. Gateway FESs provide MTS and MTCRS services. Base FESs provide MRS and NR services.

The MET 2606 provides the mobile user access to the communications channels and services provided by the satellite network system. A range of terminal types has been defined for the satellite network system.

The RMS 2608 monitors L-band RF spectrum and transmission performance in specific L-band beams. An RMS 2608 is nominally located in each L-band beam. Each RMS interfaces with the NOC via either a satellite or terrestrial link.

The STS provides an L-band network access capability to support FES 2604 commissioning tests and network service diagnostic tests. The STS is collocated with, and interfaced to, the NOC.

Communications channels transport voice transmissions between METs 2606 and FESs 2604 via the satellite. Connectivity for MET-to-MET calls is accomplished by double hopping the communications channels via equipped FESs 2504. Signaling channels are used to set up and tear down communications circuits, to monitor and control FES 2604 and MET 2606 operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs 2600, NCCs 2602, and Data Hubs, as well as external entities 2610. Various leased and dial-up lines are used for specific applications within the satellite network system such as backup interstation links between the NCC 2602 and FESs 2604 and interconnection of RMSs 2608 with the NOC 2600.

The primary function of the NOC 2600 is to manage and control the resources of the satellite network system. The NOC 2600 computer is shown with network connections, peripheral disks, fault tolerant features, and expansion capabilities to accommodate future growth. The NOC 2600 software can be represented as two major layers, a functional layer and a support layer. The functional layer represents the application specific portion of the NOC 2600 software. The support layer represents software subsystems which provide a general class of services and are used by the subsystems in the functional layer.

The application specific functions performed by the NOC 2600 are organized according to five categories: fault management, accounting management, configuration management, performance management, and security management. The general NCC Terminal Equipment (NCCTE) configuration has constituent equipment including: processing equipment, communications equipment, mass storage equipment, man-machine interface equipment, and optional secure MET Access Security Key (ASK) storage equipment. The Processing Equipment consists of one or more digital processors that provide overall NCC 2602 control, LSAM call processing, network access processing and internetwork communications processing.

The Communications Equipment consists of satellite signaling and communications channel units and an FES terrestrial communication link interface units. The mass storage equipment provides NCC 2602 network configuration database storage, call record spool buffering and executable program storage. The man-machine interface (MMI) equipment provides operator command, display and hard copy facilities, and operator access to the computer operating systems. The MET ASK storage equipment provides a physically secure facility for protecting and distributing MET access security keys.

The NCCTE comprises three functional subsystems: NCCTE Common Equipment Subsystem, Group Controller Subsystem, and Network Access Subsystem. The NCCTE Common Equipment subsystem comprises an NCC 2602 Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES 2604 and Group Controller call accounting data, transfer of transaction information to an off-line NCC 2602 and control and monitoring of FESs.

The mass storage element provides NCC 2602 network configuration database storage, call accounting data spool buffering, and NCCTE executable program storage. The man-machine interface provides operator command and display facilities for control and monitoring of NCC 2602 operation and includes hard copy facilities for logging events and alarms. A group controller (GC) is the physical NCC 2602 entity consisting of hardware and software processing resources that provides real time control according to the CG database received from the NOC 2602.

The group controller subsystem may incorporate one to four group controllers. Each group controller maintains state machines for every call in progress within the Control Group. It allocates and de-allocates circuits for FES-MET calls within each beam of the system, manages virtual network call processing, MET 2606 authentication, and provides certain elements of call accounting. When required, it provides satellite bandwidth resources to the NOC 2600 for AMS(R)S resource provisioning. The group controller monitors the performance of call processing and satellite circuit pool utilization. It also performs MET 2606 management, commissioning and periodic performance verification testing.

The Network Access Subsystem consists of satellite interface channel equipment for out-of-band signaling and Interstation Signaling which are used to respond to MET 2606 and FES 2604 requests for communications services. A network access processor also includes MET 2606 communications interfaces that are used to perform MET 2606 commission testing. In addition, the subsystem includes terrestrial data link equipment for selected FES 2604 interstation signaling.

The principal function of the FES 2604 is to provide the required circuit switched connections between the satellite radio channels, which provide communications links to the mobile earth terminals, and either the PSTN or PN. FESs 2604 will be configured as Gateway Stations (GS) to provide MTS and MTCRS services or base stations to provide MRS and net radio services. Gateway and base functions can be combined in a single station.

The FES 2604 operates under the real time control of the Network Communications Controller (NCC) to implement the call set-up and take-down procedures of the communications channels to and from the METs. Control of the FES 2604 by the NCC 2602 is provided via the interstation signaling channels. An FES will support multiple control groups and virtual networks. The FES 2604 is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are downconverted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES 2604 and to connect the METs 2606 to the appropriate PSTN or PN port. Under control of the NCC 2602, the FES 2604 assigns communications channel units to handle calls initiated by MET 2606 or PSTN subscribers. The FES-TE also performs alarm reporting, call detail record recording, and provision of operator interfaces.

For operational convenience, an FES 2604 may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs 2604 or an analog interconnect for FESs 2604 equipped with only a limited number of channels may be employed.

While this invention has been described in terms of several preferred embodiments, it is contemplated that alternatives, modifications, permutations and equivalents thereof will become apparent to those skilled in the art upon a reading of the specification and study of the drawings. It is therefore intended that the true spirit and scope of the present include all such alternatives, modifications, permutations and equivalents.

Figure 27:
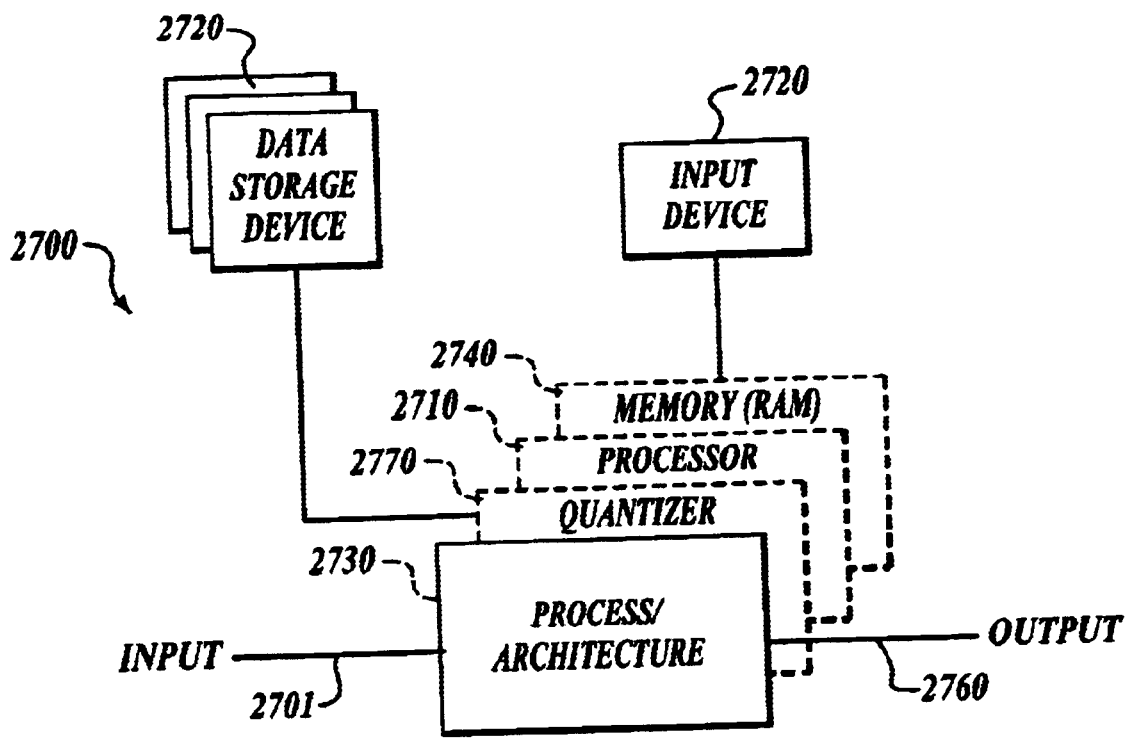
FIG. 27 is an exemplary hardware environment for one embodiment of the present invention.

Referring to FIG. 27, another hardware environment for validating a request as shown 2700 according to the present invention. The present invention may be implemented using an on-line transaction controller 2730, comprised of a processor 2710 and memory (RAM) 2740. It is envisioned that attached to the recovery circuit 2730 may be a memory device 2740. Also included in this embodiment may be input devices 2750, for downloading data and commands.

The on-line transaction controller 2730 may operate under the control of an operating system. The controller 2730 executes one or more computer programs under the control of the operating system.

Generally, the operating system and the circuit programs may be tangibly embodied in a computer-readable medium or carrier, e.g. one or more of the fixed or removable data storage devices 2720, or other data storage or data communications devices. A quantizer 2770 may be used for conversion or the analog signals to digital between the controller 2730 and any connecting digital device. Both operating system and the computer programs may be loaded from the data storage devices into the memory 2740 of the controller 2730 for execution by the processor 2710. Those skilled in the art will recognize that the memory 2740 is optional, or may be a memory device embedded or otherwise couple to the controller 2730. Both the operating system and the generator programs comprise instructions which, when read and executed by the processor 2710, cause the controller 2730 to perform the steps necessary to execute the steps or elements of the present invention. The resulting digital output 2760 is produced.

Although one on-line transaction controller configuration is illustrated in FIG. 27, those skilled in the art will recognize that any number of different configurations performing similar functions may be used in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching.

What is claimed is:

1. A method for validating a request comprising the steps of:

providing predetermined network information, the information residing in a storage medium;

receiving a request generated by one of a plurality of modules, wherein the request provides transactional information;

comparing the transactional information with the predetermined network information, the comparison including making decisions based on business rules; and manipulating the transactional information upon detection of a discrepancy relative to the predetermined network information.

2. The method of claim 1, wherein the providing step further comprises storing a portion of the predetermined information in a local cache.

3. The method of claim 1, wherein the comparing step further comprises automating error and reject processing of the requests, wherein corrections made to business rules to predispose similar corrections in the requests.

4. The method of claim 3, wherein the processing of errors and rejections are logged in the storage medium.

5. The method of claim 1, wherein the manipulation of the transactional information is carried out on-line.

6. The method of claim 1 further comprises the step of resubmitting the requests upon manipulation.

7. The method of claim 1, wherein manipulating transactional information comprises manipulating at least one of a rule, a reference, and an individual transaction data having ordering and pre-ordering functionality.

8. The method as in claim 1, the business rules being encoded in a table configuration in the storage medium.

9. The method as in claim 1, the transactional information comprising order information that is received by a front end system, and the comparison being performed by an application programming interface that is independent of the front end system.

10. The method as in claim 1, the business rules including order process and order management business rules.

11. The method as in claim 1, the business rules defining how telecommunication service is provisioned.

12. The method as in claim 1, the business rules being related to telecommunication service activation connectivity.

13. The method as in claim 1, the transactional information comprising order information related to telecommunication services.

14. The method as in claim 13, the comparison capable of being performed on order information where different jurisdictions, provisioning operation, sale negotiation flows, or technology platforms apply to the transactional information.

15. The method as in claim 1, the business rules relating to telecommunication services.

16. The method as in claim 15, the business rules comprising validation rules.

17. The method as in claim 15, the business rules comprising exception rules.

18. A computer program embodied on a computer readable medium for validating service requests comprising:

a code segment that provides predetermined network information, the information residing in a storage medium;

a code segment that receives a request generated by one of a plurality of modules, wherein the request provides transactional information;

a code segment that compares the transactional information with the predetermined network information, the comparison including making decisions based on business rules; and a code segment that manipulates the transactional information upon detection of a discrepancy relative to the predetermined network information.

19. The computer program of claim 18, wherein the code segment that provides predetermined network information further comprises a local cache for storing a portion of the predetermined information.

20. The computer program of claim 19 further comprises resubmission of the requests upon manipulation.

21. The computer program of claim 19, wherein the transactional information includes at least one of a rule, a reference, and an individual transaction data having ordering and pre-ordering functionality.

22. The computer program of claim 18, wherein the comparison of transactional information with the predetermined network information further comprises automating error and reject processing of the requests, wherein corrections made to business rules to predispose similar corrections to the requests.

23. The computer program of claim 22, wherein processing of errors and rejections are logged in the storage medium.

24. The computer program of claim 18, wherein the manipulation of the transactional information is carried out on-line.

25. A system for validating service requests comprising:

logic that provides predetermined network information, the information residing in a storage medium;

logic that receives a request generated by one of a plurality of modules, wherein the request provides transactional information;

logic that compares the transactional information with the predetermined network information, the comparison including decisions based on business rules; and logic that manipulates the transactional information upon detection of a discrepancy relative to the predetermined network information.

26. The system of claim 25, wherein the providing step further comprises storing a portion of the predetermined information in a local cache.

27. The system of claim 25, wherein the comparing step further comprises automating error and reject processing of the requests, wherein corrections made to business rules to predispose similar corrections to the requests.

28. The system of claim 27, wherein errors and rejections are logged in the storage medium.

29. The system of claim 25, wherein the manipulation of the transactional information is carried out on-line.

30. The system of claim 25 further comprises resubmission of the requests upon manipulation.

31. The system of claim 25, wherein the transactional information includes at least one of a rule, reference, and an individual transaction data having ordering and pre-ordering functionality.

32. The system of claim 25 further comprising a satellite interface for transmitting and receiving satellite information.

33. The system of claim 32, wherein the satellite interface provides a plurality of communication services for relaying information to fixed and mobile stations.

34. An article of manufacture for providing an on-line transaction controller in a local service activation environment, the article of manufacture comprising a computer readable medium having local service activation instructions comprising:

providing predetermined network information, the information residing in a storage medium;

receiving a request generated by one of a plurality of modules, wherein the request provides transactional information;

comparing the transactional information with the predetermined network information, the comparison including making decisions based on business rules; and manipulating the transactional information upon detection of a discrepancy relative to the predetermined network information.

* * * * *